Oct. 19, 1965  D. B. CONGLETON  3,213,423
CHARACTER READER
Filed Dec. 17, 1962  13 Sheets-Sheet 1

INVENTOR:
David B. Congleton
Louis A. Kline
John J. MacLago
Nathan Cass
His Attorneys Oct. 19, 1965   D. B. CONGLETON   3,213,423
CHARACTER READER
Filed Dec. 17, 1962   13 Sheets-Sheet 2

INVENTOR:
David B. Congleton

Louis A. Kline
John J. Matlago
Nathan Cass
His Attorneys

INVENTOR:
David B. Congleton

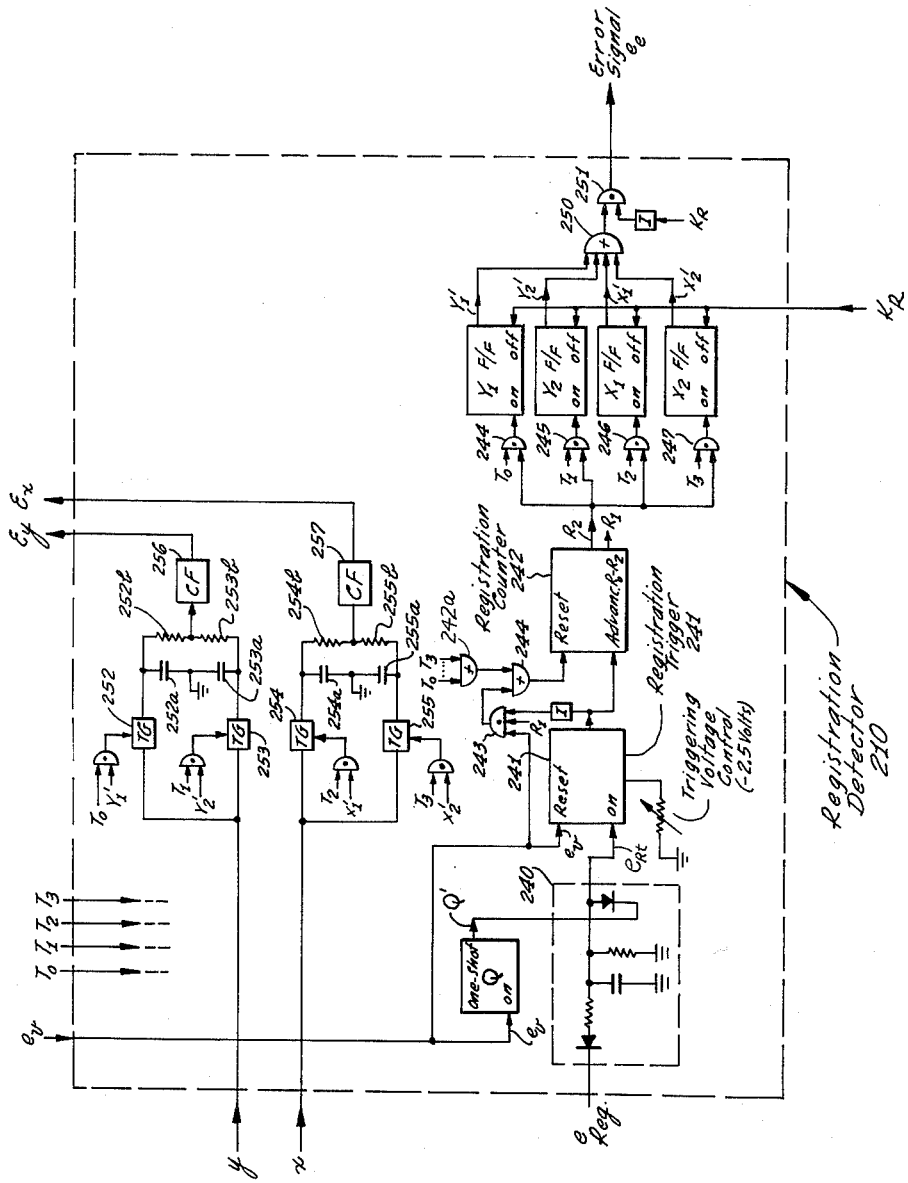

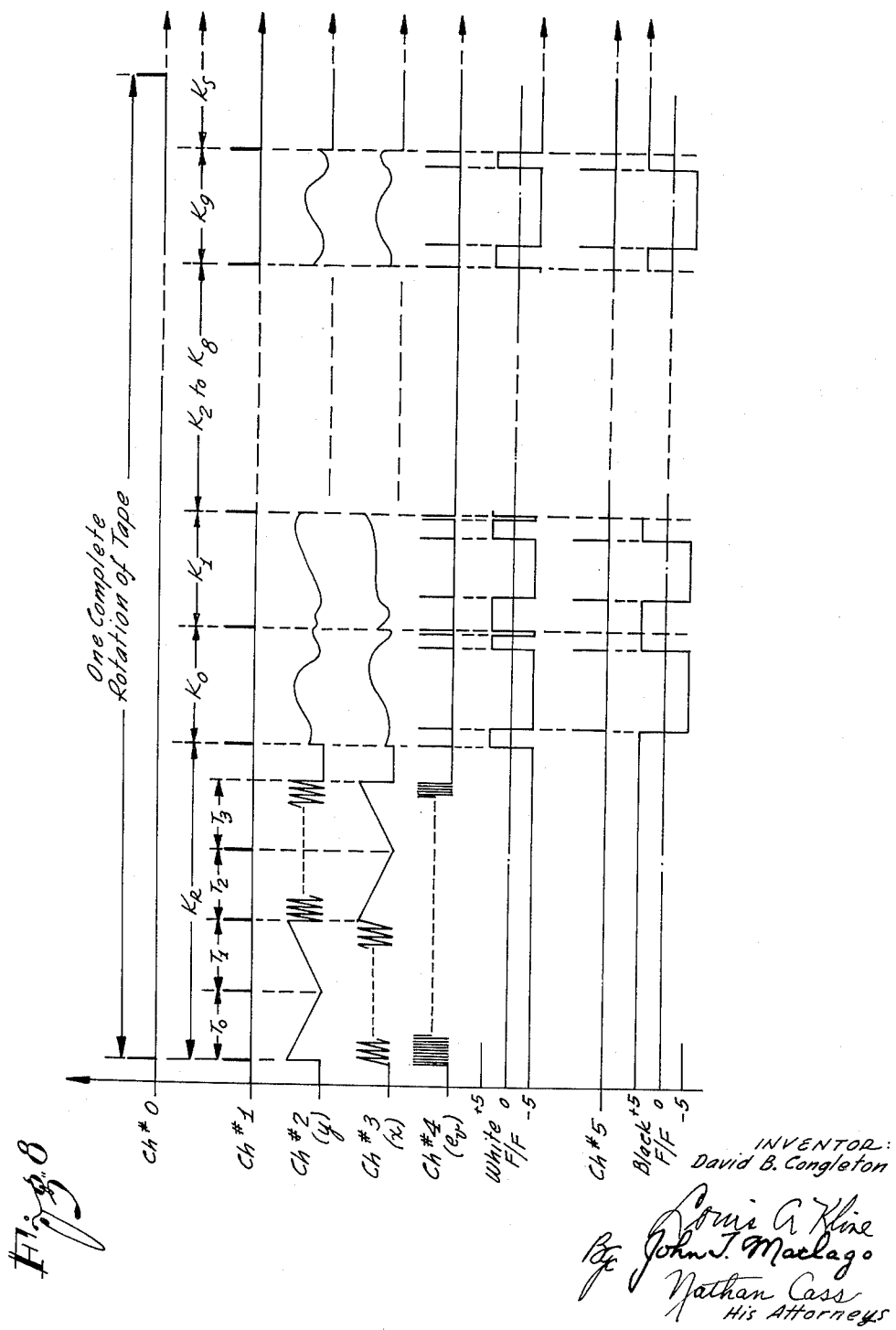

Oct. 19, 1965   D. B. CONGLETON   3,213,423
CHARACTER READER
Filed Dec. 17, 1962   13 Sheets-Sheet 8

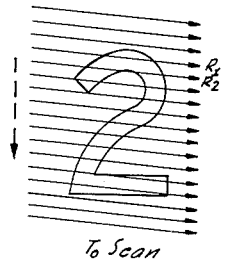
Fig. 9
$T_0$ Scan

Fig. 10
$T_1$ Scan

Fig. 14

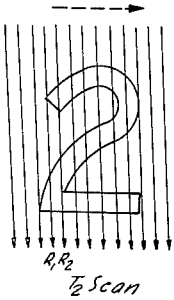
Fig. 11
$T_2$ Scan

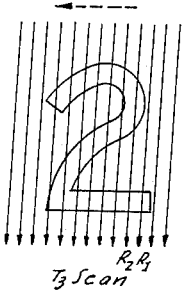
Fig. 12
$T_3$ Scan

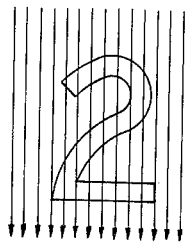

Fig. 19

| Sequence No. | Count of Scan Counter 80 | Matrix F/F | White F/F | | Black F/F | |
|---|---|---|---|---|---|---|
| | | | "on" | "off" | "on" | "off" |
| 0 | $K_2 k_0$ | ---- | X | | | |
| 1 | $K_2 k_1$ | ---- | X | | | |
| 2 | $K_2 k_2$ | ---- | X | | | |
| ⋮ | ⋮ | ⋮ | ⋮ | ⋮ | ⋮ | ⋮ |
| 7 | $K_2 k_7$ | ---- | X | | | X |
| 8 | $K_2 k_8$ | $M_6 N_4$ | | X | X | |
| 9 | $K_2 k_9$ | $M_5 N_5$ | | X | X | |
| 10 | $K_2 k_{10}$ | $M_4 N_6$ | | X | X | |
| ⋮ | ⋮ | ⋮ | ⋮ | ⋮ | ⋮ | ⋮ |
| 32 | $K_2 k_{32}$ | $M_{15} N_7$ | | X | X | |
| 33 | $K_2 k_{33}$ | $M_{14} N_8$ | X | | | X |
| 34 | $K_2 k_{34}$ | $M_{13} N_9$ | X | | | X |
| 35 | $K_2 k_{35}$ | $M_{13} N_{10}$ | X | | | X |
| 36 | $K_2 k_{36}$ | $M_{12} N_4$ | X | | | X |
| | $K_2 k_{37}$ | ---- | | | X | X |

INVENTOR:
David B. Congleton
Louis A. Kline
By John J. Matlago
Nathan Cass
His Attorneys

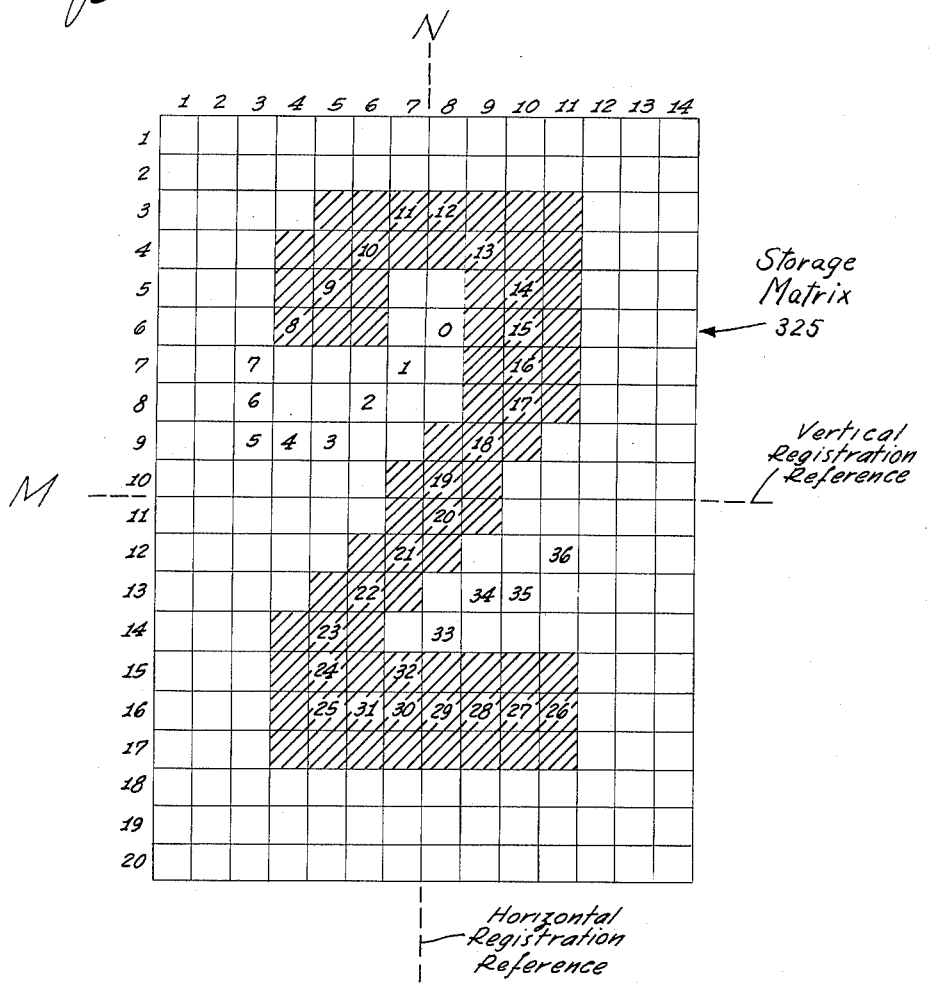

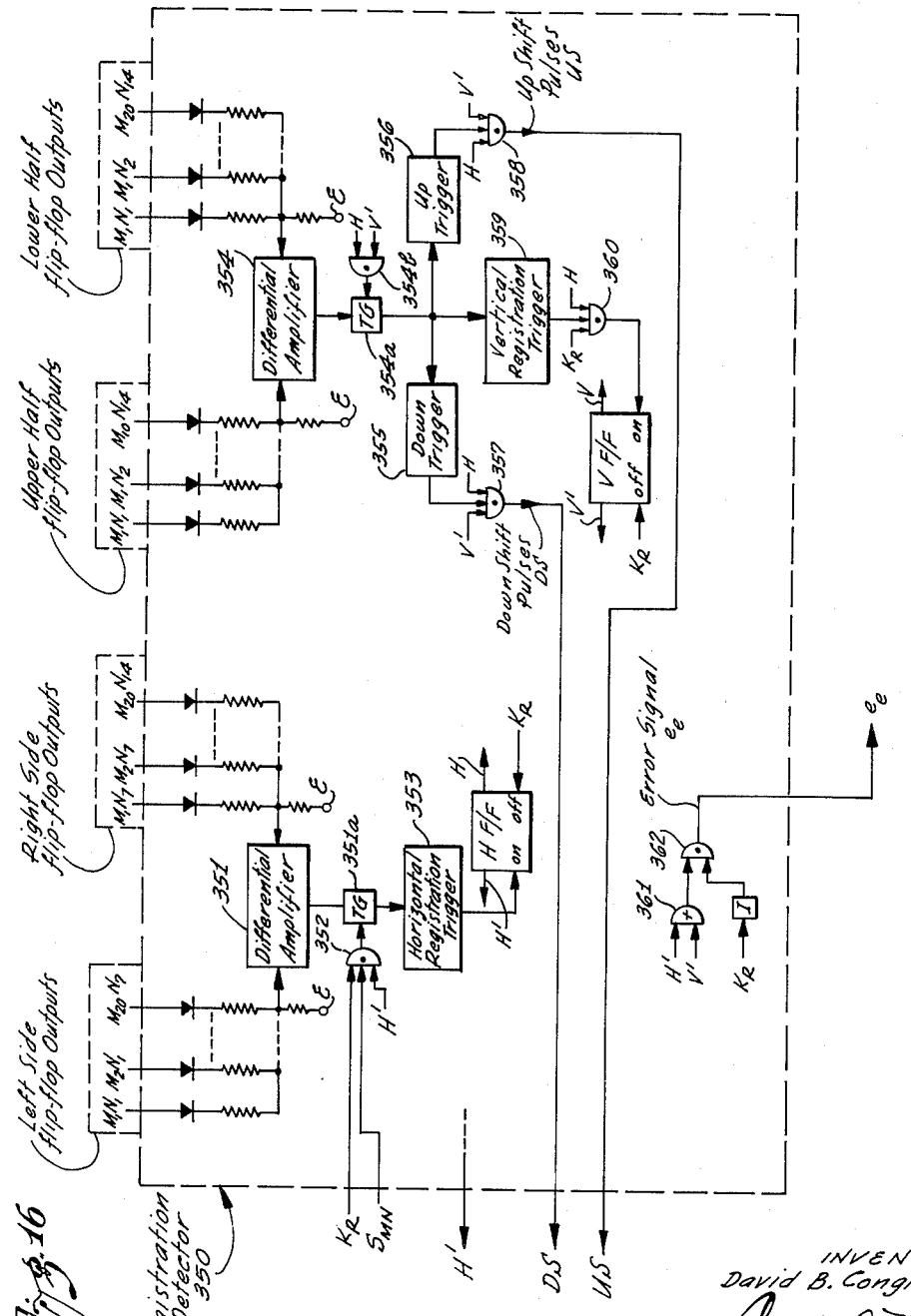

INVENTOR:
David B. Congleton

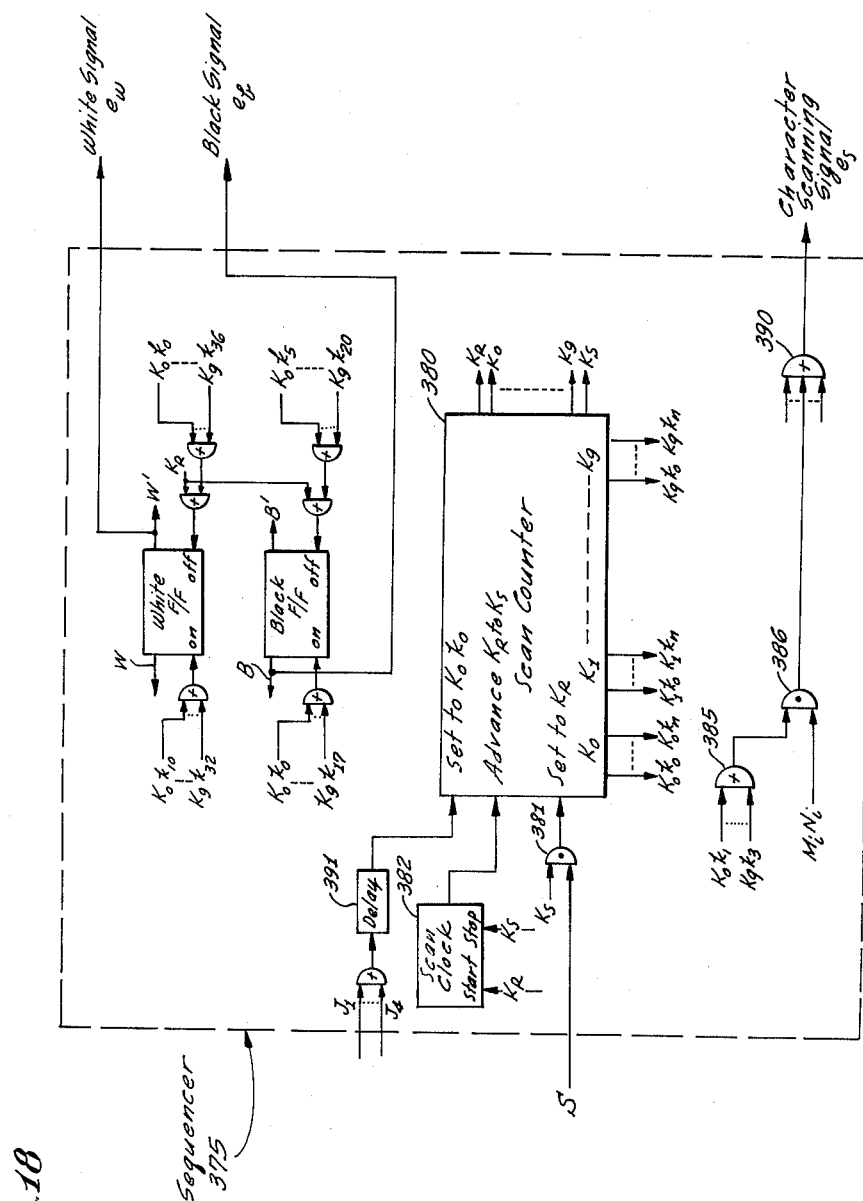

United States Patent Office 3,213,423
Patented Oct. 19, 1965

3,213,423
CHARACTER READER
David B. Congleton, Torrance, Calif., assignor to The National Cash Register Company, Dayton, Ohio, a corporation of Maryland
Filed Dec. 17, 1962, Ser. No. 245,271
20 Claims. (Cl. 340—146.3)

This invention relates generally to character readers, and more particularly to an improved character reader which makes use of contour comparison techniques to recognize characters.

With the ever expanding use of computers and other automatic equipment in business and industry, there has been an increased interest in reading machines capable of reading ordinary printing so that the data represented by such printing can be directly fed to a computer or other utilization device without the need of first manually transforming the data into a special code suitable for the computer. Various approaches to character readers have been proposed, and a number of these are described in the National Bureau of Standards Technical Note 112, dated May 1961, and entitled, "Automatic Character Recognition—A-State-of-the-Art Report."

It is the broad object of the present invention to provide a new approach to character reading which offers significant advantages in various important respects over approaches already known in the art.

More specifically, it is an object of the present invention to provide an improved character reader which recognizes characters using a novel contour comparison approach.

Another object of the invention is to provide an improved character reader which is able to read commonly available printing without being unduly restricted to a particular font.

A further object of the invention is to provide an improved character reader in accordance with any or all of the foregoing objects, which has the further advantage of being able to handle a large font set.

Still another object of the invention is to provide an improved character reader in accordance with any or all of the foregoing objects, which has a very low probability of misreading characters—that is, of mistaking one character for another.

Yet another object of the invention is to provide an improved character reader in accordance with any or all of the foregoing objects, which is amenable to the incorporation of registration techniques for handling misregistered characters—that is, characters displaced or rotated from their normal or expected position.

A still further object of the present invention is to provide an improved character reader in accordance with any or all of the foregoing objects, which requires a minimum of logical recognition circuitry.

Another object of the invention is to provide improved means and methods for carrying out the foregoing objects.

An additional object of the invention is to provide an improved character reader in accordance with any or all of the foregoing objects, which is relatively simple and inexpensive in view of its reading capability.

The above objects are accomplished in accordance with the present invention by the use of a contour comparison recognition approach in which some unknown geometry representing a character is compared, in a predetermined manner, with standard or reference geometries corresponding to the various characters in the set. More specifically, contour comparison is accomplished in accordance with the present invention by providing a uniquely chosen scanning path for each character in the set, a character then being recognized by determining which scanning path properly fits the character being scanned. Various types of scanning paths are of course possible, the important factor being that each scan be uniquely representative of a respective character in the font.

In the typical embodiment of the invention to be described herein, the unique scanning path for each character is chosen so as to traverse the contours of its respective character—that is, the black portions of the character—and as much of the background or white portion as is necessary or desirable for a unique identification of the character. It is to be understood that many other types of scanning paths are possible which would also be uniquely representative of respective characters in a given font. Identification of a character is then accomplished, after the character has first been properly registered in the scanning field, by scanning the character with each of the unique character scanning paths provided (one for each character in the set) and a running average of the print density is observed for each scanning path. When this observed running average for a particular character scanning path is in sufficient agreement with what is expected during that scanning path, the character will be identified as the particular character to which the scanning path corresponds. If no unique character is obtained after all the scans have been performed, the character can then be rejected as unreadable, or else, the character position can be shifted (since misregistration may cause a character to be unreadable) and the identification procedure repeated. Such shifting of the character may be repeated a number of times in one or more different directions in an attempt to correctly read the character, and if the character still cannot be read after a desired predetermined number of tries, it may then be recorded as an unreadable character.

The specific nature of the present invention as well as other objects, uses, and advantages thereof will become apparent from the following description and the accompanying drawings in which:

FIG. 7 is a block and circuit diagram of a typical embodiment of the registration detector 210 of FIG. 5;

FIG. 8 is a series of graphs illustrating typical signals provided by the scan generator of FIG. 6;

FIGS. 9–12 are schematic diagrams illustrating typical registration scans which may be provided by the scan generator of FIG. 6 for use in registering a character;

FIG. 14 is a schematic diagram illustrating how each character is optically scanned in the scanning system embodiment of FIG. 13 for producing an electronic image which is then scanned electronically to perform the character contour scans;

FIG. 15 is a schematic diagram of the storage matrix 325 of FIG. 13;

FIG. 16 is a block and circuit diagram of a typical embodiment of the registration detector 350 of FIG. 13;

FIG. 18 is a block and circuit diagram illustrating a typical embodiment of the scan sequencer 375 of FIG. 13; and FIG. 19 is a table illustrating the operation of the scan sequencer of FIG. 18 during a typical "2" scan of the matrix of FIG. 15.

Like numerals denote like elements throughout the figures of the drawings.

In describing an illustrative embodiment of a character reader in accordance with the present invention, a broad general description will first be given with reference to FIG. 1 in order to permit the novel approach of the present invention to be clearly understood. Then, specific typical embodiments of principal portions of the illustrative character reader will be presented to illustrate how the novel approach of the invention may be implemented.

GENERAL DESCRIPTION

Figure 1:
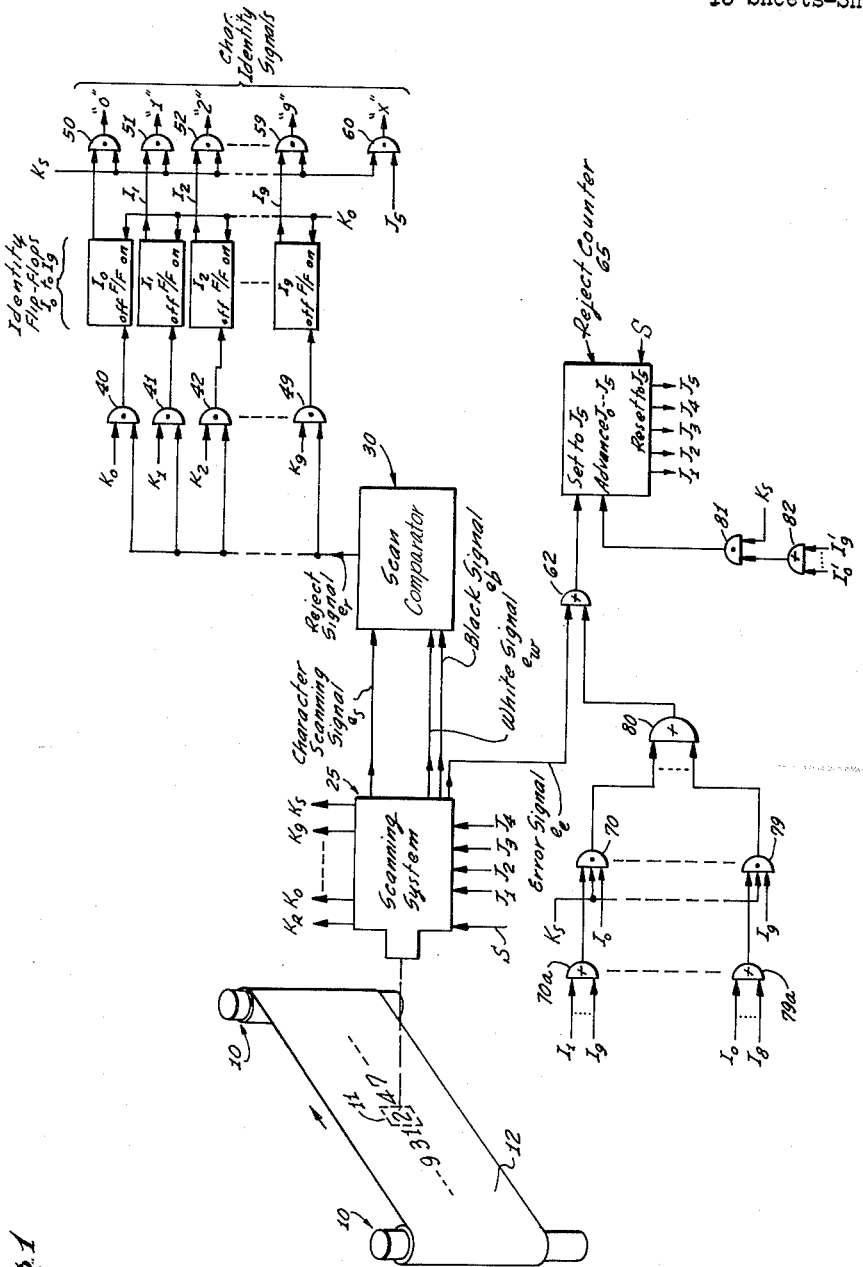
FIG. 1 is a block and circuit diagram of a typical embodiment of a character reader in accordance with the invention.
Figure 2:
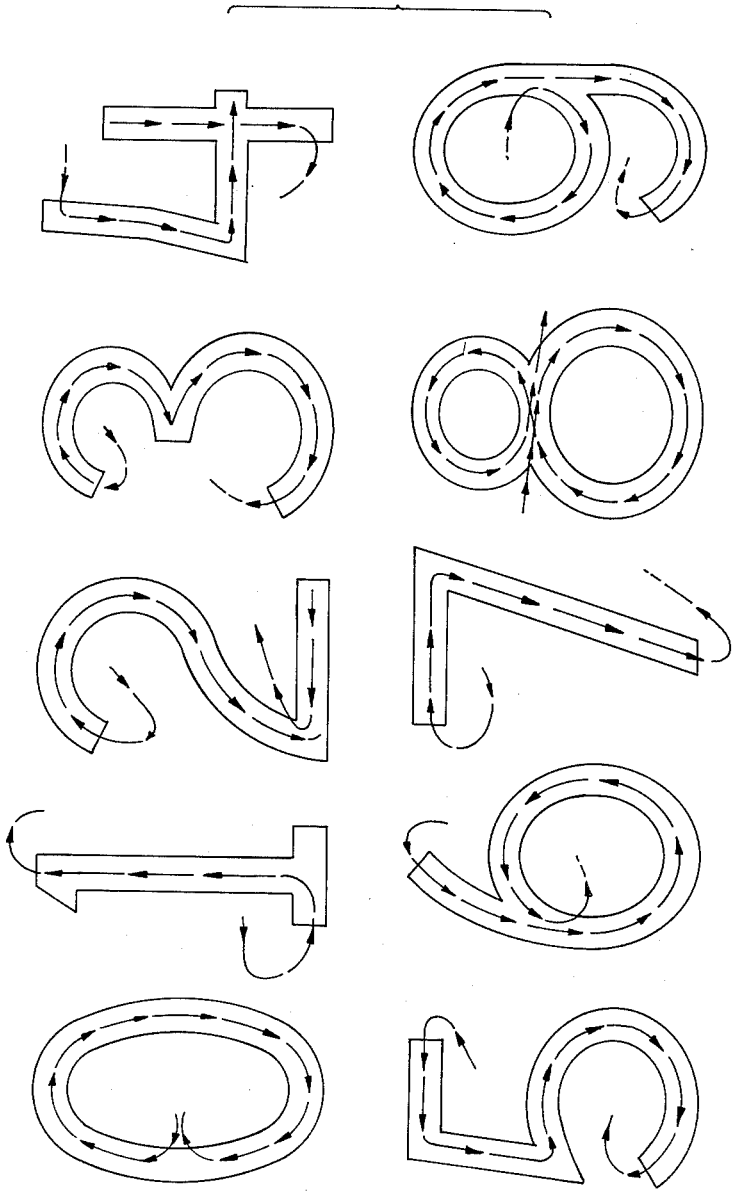
FIG. 2 shows a typical character font along with an exemplary contour scan for each character which may be provided for use with the FIG. 1 embodiment.

(FIGS. 1 and 2)

Therefore, referring first to FIG. 1, an overall block and circuit diagram is illustrated of a typical embodiment of a character reader in accordance with the present invention. A paper handler generally illustrated at 10 moves a paper sheet 12 having characters printed thereon past a scanning system 25. In the typical embodiment to be described herein, it will be assumed that the characters are digits, but this is done only for illustrative purposes and, as will become evident, the invention may be used for reading alphabetic characters or any other desired characters or symbols.

As the paper handler 10 moves each character into the scanning field (indicated at 11 in FIG. 1), a start signal S is caused to be produced which is fed to the scanning system 25. In response to the start signal S, the scanning system 25 first registers the character in the proper position with respect to the contour scans to be performed by the scanning system 25. Such registration is desirable to permit the system to handle characters having reasonable amounts of horizontal and/or vertical misregistration. If registration is not obtainable for some reason (for example, the character may be too light or may have large portions missing), then an error signal $e_e$ is provided by the scanning system 25 to indicate the failure to register the character.

After the unknown character has been properly registered in the scanning field 11, the scanning system 25 then scans the character with each of a plurality of unique scans respectively corresponding to the characters in the font with which the reader is designed to operate, each character being provided with a distinct unique scan representative of the contour of the character. Assuming for exemplary purposes that the font comprises the ten decimal digits 0, 1, 2, . . . 9, then the scanning system 25 will provide ten different character contour scans of the unknown character, each character contour scan being chosen so as to be uniquely representative of the contour of a respective one of these ten decimal digits. The particular time during which each of the character contour scans are performed by the scanning system 25 is indicated by respective counts $K_0$, $K_1$ . . . $K_9$ which respectively correspond to the character contour scans for the decimal digits 0, 1, . . . 9. A registration count $K_R$ precedes counts $K_0$ to $K_9$ and represents the particular time during which the scanning system 25 is in the process of registering a character in the scanning field 11. An additional count $K_s$ is produced following count $K_0$ to $K_9$ in order to indicate that all of the required scans have been completed.

FIG. 2 illustrates examplary character scans which may be employed for the digits "0" to "9" in the typical embodiment of the invention being described herein, it being understood that other types of scans are possible and the invention is not limited to either the scans or characters shown. It will be noted in FIG. 2 that the scan path for each character is preferably chosen so that the scan follows the contour of its respective character (that is, the black portions of the character) and includes as much of the background (white portion) as is considered desirable for a unique detection of each character without ambiguity. It will be appreciated that instead of scanning the entire portion of a character at one time, as indicated in FIG. 2, the scan may travel along character portions and background portions alternately. For example, the scan may travel along a character portion for a while, then travel along a background portion, and then return to a character portion, and this may occur as many times as desired during a character scan. In such cases, imperfections (such as small discontinuities in the character, or ink splatter or other defects in printing) can be prevented from misleading the recognition circuitry by having each scan along a character portion include a distance of the order of at least 3 or 4 times the character stroke width. In this way, the running average level observed will essentially represent character information and small defects will be ignored.

Returning now to FIG. 1 it will be understood that during each of the ten character contour scans performed by the scanning system 25, a suitable character signal $e_s$ may be provided which corresponds to the instantaneous black-white level observed. Typical $e_s$ signals are illustrated by the solid line curves in graphs A and D of FIG. 4, and will be considered in more detail later on when more specific embodiments of the invention are described.

In addition to the character scanning signal $e_s$, the scanning system 25 of FIG. 1 also provides two comparison signals during each of the ten character contour scans, a black signal $e_b$ and a white signal $e_w$. These black and white signals $e_b$ and $e_w$ represent the respective periods during each character contour scan for which black and white indications are expected to be present in the scanning signal $e_s$ if the unknown character in the scanning field 11 is identical to the character whose unique scanning path is then being traversed. Typical black and white signals $e_b$ and $e_w$ are illustrated in graphs B and C of FIG. 4, and will also be considered in more detail later on in this description when more specific embodiments of the invention are taken up.

As indicated in FIG. 1, the character scanning signal $e_s$ and the black and white signals $e_b$ and $e_w$ provided by the scanning system 25 are fed to a scan comparator 30. The scan comparator 30 is constructed and arranged to determine whether the running average level of the observed character scanning signal $e_s$ properly compares with its expected black and white signals $e_b$ and $e_w$ during each of the ten character contour scans and, if not, to produce a reject signal $e_r$ whenever a proper comparison is not obtained during a character contour scan. Thus, in the normal situation when there are no registration or other problems, the performance of the ten character contour scans by the scanning system 25 should result in at least one reject signal $e_r$ being obtained during each character scan, except the one which corresponds to the character presently in the scanning field 11.

Still with reference to FIG. 1, it will be seen that the reject signals $e_r$ provided by the scan comparator 30 are fed to one input of each of a series of ten AND gates 40, 41, . . . 49, which AND gates may be of conventional form. The other input of each of these ten AND gates 40 to 49 is fed by a respective one of the counts $K_0$ to $K_9$ which, as pointed out previously, represent the particular character scan being performed by the scanning system 25. In accordance with conventional nomenclature, each of the reject signals $e_r$ and the counts $K_0$ to $K_9$ can be considered as being "true" when present, and "false" when absent, and each of the AND gates 40 to 49 can be considered as producing a "true" output signal only when both of its inputs are "true," and a "false" output at all other times. Also, it is to be noted that unless indicated otherwise, each flip-flop, counter, or trigger circuit to be described herein will be assumed to switch, advance, reset or set (as the case may be) in response to the leading edge of a "true" signal applied thereto. If the flip-flop, counter, or trigger circuit is already in the state called for, no change will occur.

The outputs of the ten AND gates 40 to 49 in FIG. 1 are fed to the "off" inputs of respective ones of ten identify flip-flops $I_0$ to $I_9$ corresponding to the digits "0" to "9," respectively. The "on" inputs of these flip-flops $I_0$ to $I_9$ are all fed by the count signal $K_0$, the leading edge of which acts to turn "on" all of the identify flip-flops $I_0$ to $I_9$ (if they are not already "on"). This assures that all of the identify flip-flops $I_0$ to $I_9$ will be "on" at the beginning of the ten character scans. In accordance with conventional nomenclature, each of the unprimed outputs $I_0$ to $I_9$ of the flip-flops $I_0$ to $I_9$ (and other flip-flops to be considered later on) will be denoted as "true" when its respective flip-flop is "on" and false when its respective flip-flop is "off"; each of the primed outputs $I_0'$ to $I_9'$, on the other hand, will be denoted just the opposite, a primed output being "true" when its respective flip-flop is "on" and "false" when its respective flip-flop is "off."

Continuing with the description of FIG. 1, it will be understood that for normal operation where there are no registration or other problems, the only one of the ten identity flip-flps $I_0$ to $I_9$ which will still be "on" after all ten character scans have been performed by the scanning system 25 will be the one corresponding to the character then in the scanning field 11, since only during the particular scan corresponding to that character will no reject signal $e_r$ be produced. For example, if the character presently in the scanning field is the digit "2," then only during the "2" scan will no reject signal $e_r$ be produced, since it is only during the "2" scan that the observed scanning signal $e_s$ will properly compare with the black and white signals $e_b$ and $e_w$. Thus, at count signal $K_S$ when all of the character scans have been completed, only the $I_2$ identity flip-flop corresponding to the digit "2" will be "on."

In order to permit a signal corresponding to the particular one of the identity flip-flops $I_0, I_1, \ldots I_9$ which is "on" at count signal $K_S$ to be outputed to suitable utilization means (not shown), a second series of AND gates 50, 51, .. 59 are provided in FIG. 1 for this purpose. Each such AND gate is fed by a respective one of the unprimed flip-flop outputs $I_0, I_1, \ldots I_9$, along with count $K_S$. Thus, during count $K_S$, a true output signal will be obtained only from the particular one of the AND gates 50 to 59 whose respective identity flip-flop is "on." For example, again assuming that the digit "2" is in the scanning field 11, it will be understood that only the $I_2$ identity flip-flop will be "on" at count $K_S$, so that a "true" signal will appear only at the output of the corresponding AND gate 52 to indicate that the character in the scanning field is a "2."

In response to the outputing of the identity of the character in the scanning field 11 at count $K_S$, the paper handler 10 may be caused to move the next character into the scanning field 11 and to again produce a start signal S, whereupon the scanning system is returned to count signal $K_R$ and the above described recognition procedure is repeated. It is to be understood, of course, that it is not necessary for the character to remain fixed in the scanning field 11 during the recognition procedure as long as the motion of the character does not interfere with the performance by the scanning system 25 of the required character scans.

So far, the description of FIG. 1 has assumed normal operation in which there are no registration or other problems which would prevent identification of a character in the scanning field after the scanning system has performed the ten character contour scans. However, such normal operation will not always occur, and it will now be described how the reader of FIG. 1 is able to handle other than normal situations.

One such situation occurs as a result of the scanning system 25 producing an error signal $e_e$ in the event proper registration of a character in the scanning field 11 cannot be obtained. To handle this situation, the error signal $e_e$ is fed through a conventional OR gate 62 to a reject counter 65 to set the counter to its last count $J_5$. This count $J_5$ is in turn fed to an additional output AND gate 60 along with count $K_S$ from the scanning means 25. As a result, when all ten scans have been completed and the scanning system 25 reaches count $K_S$, the output "X" of AND gate 60 will provide a "true" output to indicate that the character is unreadable so that a "true" output from any of the other AND gates 50 to 59 should be ignored. Such a feature prevents a character which cannot be registered from being incorrectly read. As is well known in the character reading art, the misreading of a character (that is, mistaking one character for another character) is a much more serious situation than knowingly rejecting a character as unreadable, since a misread character leads to unknown errors, while a rejected character can, if need be, entered manually without affecting system accuracy.

Other situations can affect normal operation besides the type of registration error indicated by error signal $e_e$. For example, it is possible that, for some reason, more than one of the identity flip-flops $I_0$ to $I_9$ in FIG. 1 will still be "on" when count $K_S$ is reached as a result of a correct comparison having been achieved for more than one character. Rather than attempting to choose between the two or more characters whose identity flip-flops are "on" and risk misreading a character, the reject counter 65 is again employed and caused to be again set to count $J_5$ whenever this situation occurs—that is, whenever more than one of the identity flip-flops $I_0$ to $I_9$ is "on" at count $K_S$. Setting the reject counter 65 to count $J_5$ when this situation occurs is accomplished, as indicated in FIG. 1, by feeding each of the outputs $I_0$ to $I_9$ of the identity flip-flops to a respective one of the AND gates 70 to 79, along with the count $K_S$ and the output of a respective one of the OR gates 70a to 79a, each of these OR gates 70a to 79a being in turn fed by all of the other unprimed identity flip-flop outputs. It will be understood, therefore, that at least one of the outputs of AND gates 70 to 79 will become "true" if more than one of the identity flip-flops $I_0$ to $I_9$ is "on" at count signal $K_S$, and the resulting "true" signal will be fed through OR gates 80 and 62 to set the reject counter 65 to count $J_5$. Thus, just as will occur if an error signal $e_e$ is produced by the scanning means 25, the output "X" of AND gate 60 will become true at count $K_s$ to indicate that the character in the scanning field is unreadable, and that any other "true" outputs from AND gates 50 to 59 should be ignored.

Besides the situations considered above, it is also possible that when count $K_S$ is reached, none of the identity flip-flops $I_0$ to $I_9$ will be "on" as a result of there failing to be a proper comparison obtained for any of the character contour scans. In such a situation, the reject counter 65 could again be caused to advance to count $J_5$ and an unreadable character indication obtained. However, in order to reduce the number of unreadable characters obtained, the system is designed to permit up to four additional tries at correctly reading a character, each try with a different registration. For this purpose, the reject counter 65 again comes into play and is caused to be advanced by one count each time none of the identity flip-flops $I_0$ to $I_9$ is "on" at count $K_S$. As indicated in FIG. 1, this is accomplished by feeding the count $K_S$ to AND gate 81 along with the output of OR gate 82, which in turn is fed by the primed outputs $I_0'$ to $I_9'$ of all of the identity flip-flops. As a result, when none of the identity flip-flops $I_0$ to $I_9$ are "on" at count $K_S$, the output of OR gate 82 will be "true" making the output of AND gate 81 also "true" so as to thereby cause the reject counter 65 to be advanced to the next count.

As indicated in FIG. 1, the count signals $J_1$, $J_2$, $J_3$ and $J_4$ from the reject counter 65 are fed to the scanning system 25. This is done in order to permit the scanning system 25 to alter the registration of the character in the scanning field 11 for each count of the reject counter 65 and to make another try at reading the character correctly, a different registration being provided for each of the counts $J_1$, $J_2$, $J_3$, and $J_4$ of the reject counter 65. Thus, if after the first attempt at identifying a character, none of the identity flip-flops $I_0$ to $I_9$ are "on" at count signal $K_S$, the reject counter 65 will be advanced from its initial count $J_0$ to count $J_1$ to cause the scanning system 25 to repeat the ten character contour scans with a different registration. If when count signal $K_S$ is again reached, still none of the identity flip-flops are "on," the reject counter 65 will be advanced to the next count $J_2$, and will cause the scanning system 25 to again repeat the ten character scans, with still a different registration of the character with respect to the character scans. This procedure will be repeated each time count signals $K_S$ is reached and none of the identity flip-flops $I_0$ to $I_9$ are "on," until the reject counter 65 arrives at the last count $J_5$, whereupon the scanning system will remain in count $K_S$ and no further attempts will be made to identify the character. The "X" output of AND gate 60 will then be "true" (since both $J_5$ and $K_S$ will be "true") to indicate that the character is unreadable. It is to be noted that the reject counter 65 is set to its zero count signal $J_0$ by the start signal S, which is done in order to properly set the reject counter 65 to its initial count $J_0$ for each new character moved into the scanning field. At this point it may further be noted that, as is the case for the reject counter 65, unless otherwise indicated, each other counter to be considered herein will be assumed to advance to its last count (such as $J_5$ for the reject counter 65) and to remain in this last count until reset by a "true" signal applied to a reset input of the counter.

From the foregoing, it should now be evident that the initial registration performed by the scanning system 25 during the registration count $K_R$ may be considered as a coarse registration adjustment, while the changes in registration produced by counts $J_1$ to $J_4$ of the reject counter 65 in the event that a character cannot be identified may be considered as fine registration adjustments. For example, with regard to count signals $J_1$ to $J_4$, $J_1$ may provide a registration for which the character is shifted slightly upward from its $J_0$ position, $J_2$ may provide a registration for which the character is shifted slightly downward from its $J_0$ position, $J_3$ may provide a registration for which the character is shifted slightly to the left of its $J_0$ position, and $J_4$ may provide a registration for which the character is shifted slightly to the right of its $J_0$ position. Obviously, additional counts may be provided for the reject counter 65 to provide as many tries at different registrations as may be considered desirable. Also, instead of merely shifting the character right or left, or up and down with respect to the character contour scans provided by the scanning system 25, the character could be caused to be rotated to handle skew misregistration.

Before leaving FIG. 1, it is to be noted that whether the character is identified on the first attempt (during $J_0$) or on the last attempt (during $J_4$), or whether the character is considered unreadable as a result of the reject counter 65 having reached $J_5$, the appearance of a "true" signal at the output of any of the AND gates 50 to 59 or 60 will indicate a completion of scanning of the character presently in the scanning field 11, and in response thereto, the tape handler 10 will move the next character into the scanning field 11, and produce another start signal S to initiate scanning of the new character.

TYPICAL EMBODIMENT OF THE SCAN COMPARATOR 30 IN FIG. 1

*(FIGS. 3 and 4)*

Having described the overall construction and operation of the typical embodiment of the character reader illustrated in FIG. 1, a typical specific embodiment of the scan comparator 30 of FIG. 1 will now be described.

For the purposes of this description it will be assumed that the scanning signal $e_s$ applied to the scan comparator 30 from the scanning system 25 in FIG. 1 is normalized to an average peak-to-peak voltage of approximately $+5$ to $-5$ volts, the $+5$ voltage level corresponding to black or print portions observed in the scanning field, and the $-5$ voltage level corresponding to the background or white portions. It will also be assumed that the black and white signals $e_b$ and $e_w$ (which as shown in FIG. 1 are also fed to the scan comparator 30 from the scanning system 25) will switch between the same $+5$ and $-5$ volt levels, the black signal signal $e_b$ normally residing at a constant voltage level of $+5$ volts and switching to a constant level of $-5$ volts whenever black is expected, and the white signal normally residing at a constant voltage level of $-5$ volts and switching to a constant level of $+5$ volts whenever white is expected. Typical $e_s$, $e_b$, and $e_w$ waveforms in accordance with these assumptions are illustrated in the graphs of FIG. 4 which will be considered shortly.

Figure 3:
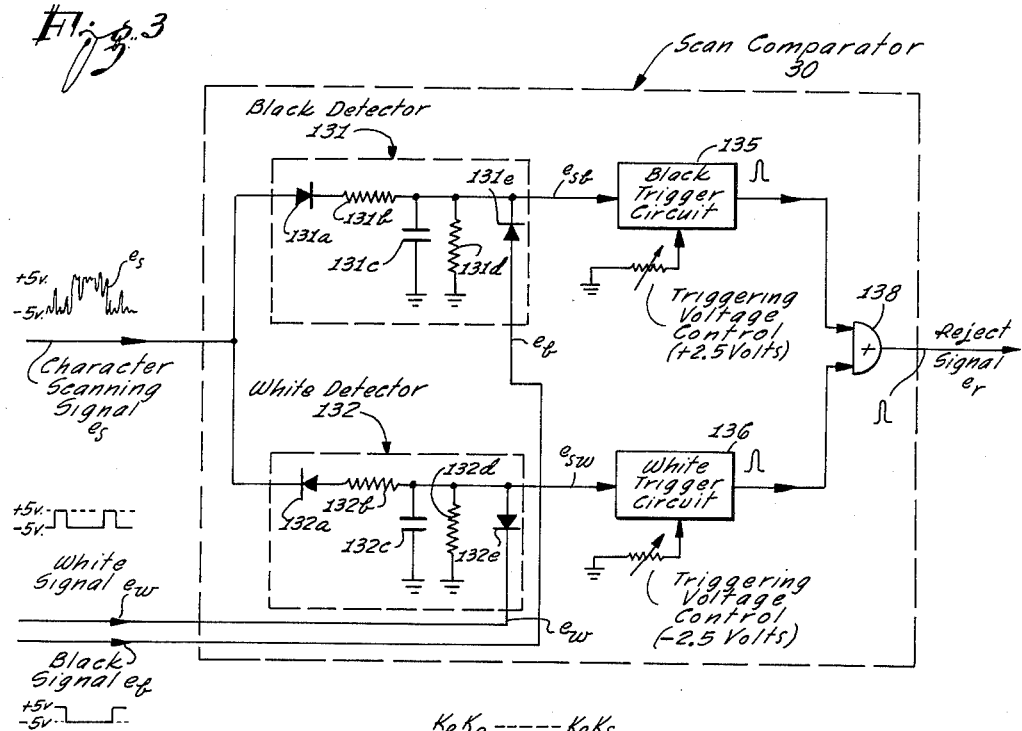
FIG. 3 is a circuit diagram of an illustrative specific embodiment of the scan comparator 30 of FIG. 1.

However, turning first to FIG. 3 for a brief description of the scan comparator 30, it will be seen that the scanning signal $e_s$ is fed to a black detector 131 and a white detector 132 along with the respective black and white signals $e_b$ and $e_w$. These detectors 131 and 132 operate to provide, at respective outputs thereof, signals $e_{sb}$ and $e_{sw}$ which are indicative of how well the instantaneous running average of the observed black and white portions of the scanning signal $e_s$ compare with the black and white signals $e_b$ and $e_w$ expected for each of the ten character scans. These detector output signals $e_{sb}$ and $e_{sw}$ are fed to the respective black and white trigger circuits 135 and 136, each of which is caused to trigger and produce an output pulse whenever its respective detector output signal $e_{sb}$ or $e_{sw}$ reaches a level which indicates that a correct comparison is not being obtained. It will be noted that the black and white trigger circuits 135 and 136 each include a triggering voltage control which may be set, either manually or automatically, to determine the voltage level which its respective detector output signal $e_{sb}$ or $e_{sw}$ must reach in order for triggering to occur. It will be appreciated that these triggering voltage levels are set so as to provide the greatest discrimination between the characters in the font and, if desired, could be made continuously adjustable (for example, in response to the print contrast or paper noise) so as to increase the tolerance of print and paper stock which may be handled by the reader. As shown in FIG. 3, the output pulses of these black and white trigger circuits 135 and 136, which may be considered as "true" signals, are fed to an OR circuit 138 whose output represents the reject signal $e_r$ illustrated in FIG. 1. As is well known in the art, an OR circuit provides a "true" output whenever any one of its inputs are "true," so that a reject signal $e_r$ will be produced whenever either of the trigger circuits 135 or 136 is triggered.

Now considering the black and white detectors 131 and 132 in more detail, it will be seen that both are of generally similar construction, each including an integrating circuit comprised of a charging resistor ($131b$ for detector 131 and 132b for detector 132), an integrating capacitor (131c for detector 131 and 132c for detector 132), and a discharge resistor (131d for detector 131 and 132d for detector 132). There are, however, two essential differences between the black and white detectors 131 and 132. First, it will be noted that the black detector 131 employs a positively poled diode 131a in series with its charging resistor 131b so as to be able to respond only to the positive or black level of the $e_s$ signal waveform, while conversely, the white detector 132 employs a negatively poled diode 132a in series with its charging resistor 132b so as to be able to respond only to the negative or white level of the $e_s$ signal waveform. The second difference between detectors 131 and 132 is that in order to permit the detectors to operate during respective periods when black or white is expected, the black signal $e_b$ is fed through a positively poled diode to the ungrounded end of the integrating capacitor 131c of detector 131, while the white signal $e_w$ is fed through a negatively poled diode 132e to the ungrounded end of the charging capacitor 132c of comparator 132.

Figure 4:
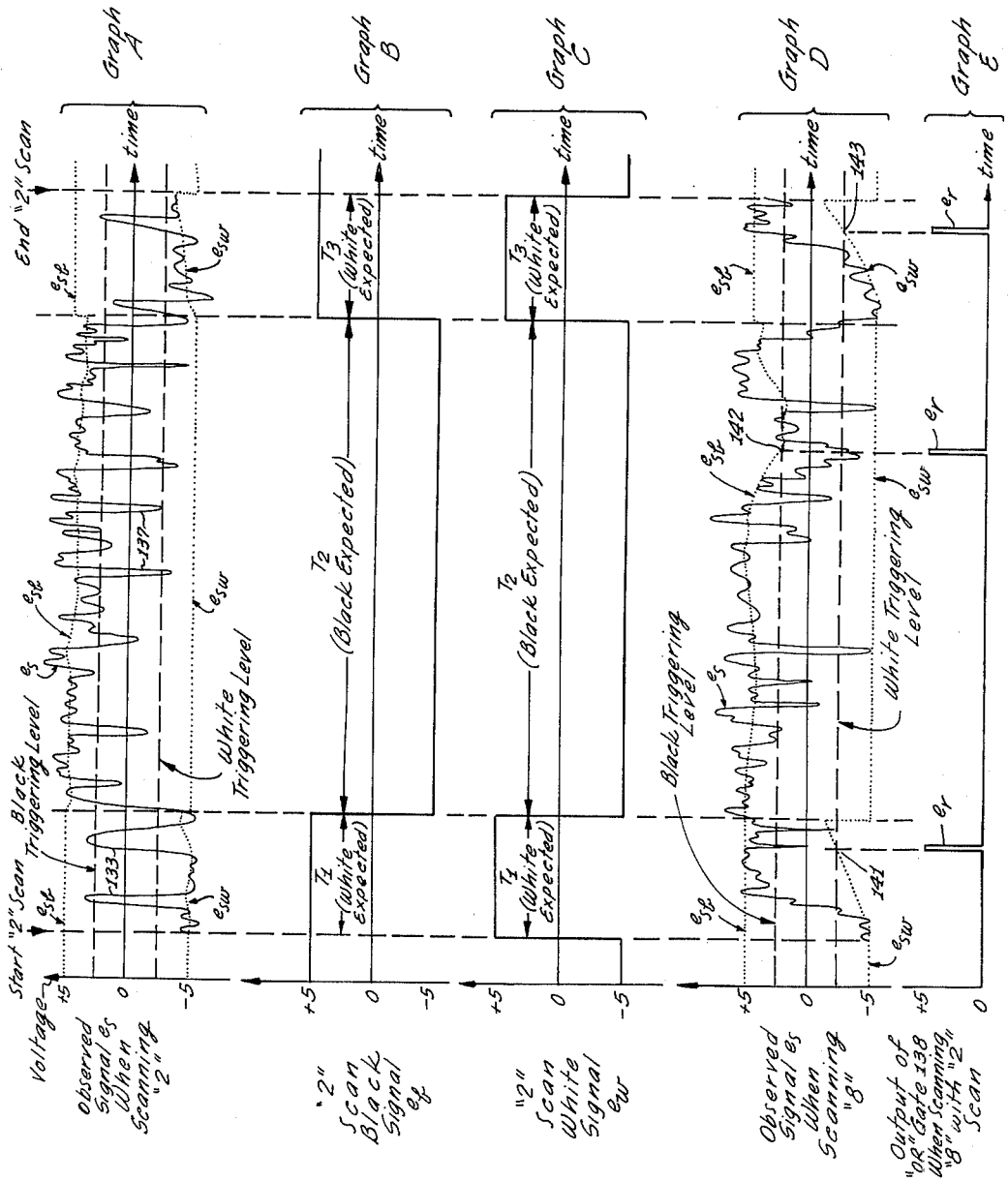
FIG. 4 is a series of graphs illustrating the operation of the specific embodiment of the scan comparator shown in FIG. 3.

The operation of the black and white detectors 131 and 132 of FIG. 3 will now be considered in detail with reference to the graphs of FIG. 4. Graph A illustrates a typical scanning signal $e_s$ and the respective outputs $e_{sb}$ and $e_{sw}$ of the black and white comparators 131 and 132 obtained when a "2" digit in the scanning field 11 (FIG. 1) is being scanned by a "2" scan. It will be noted that the $e_s$ signal in graph A has approximately the assumed $+5$ to $-5$ peak-to-peak voltage. Graphs B and C in FIG. 3 respectively illustrate typical black and white signals $e_b$ and $e_w$ produced by the scanning system 25 (FIG. 1) during the "2" scan. It will be noted that graphs B and C indicate the particular periods of the black and white signals $e_b$ and $e_w$ for which black and white are to be expected in the scanning field 11 (FIG. 1) during the "2" scan. As mentioned previously, and as will now be seen from graphs B and C of FIG. 3, the black signal $e_b$ normally resides at $+5$ volts and switches to $-5$ volts only when black is expected in the scanning field, while the white signal $e_w$ normally resides at $-5$ volts and switches to $+5$ volts only when white is expected in the scanning field.

It will further be noted in graphs B and C of FIG. 3, that just prior to the start of the "2" scan, the black and white signals $e_b$ and $e_w$ are caused to be at their normal voltage levels of $+5$ and $-5$ volts, respectively. This is done so that prior to the start of the scan the charging capacitor 131c of the black comparator 131 will be brought to $+5$ volts as a result of the $+5$ volts black signal $e_b$ being applied thereto through the positively poled diode 131e, while the charging capacitor 132c of the white comparator 132 will be brought to $-5$ volts as a result of the $-5$ volts white signal $e_w$ applied thereto through the negatively poled diode 132e. Since the forward resistances of the diodes 131e and 132e are relatively small, the charging capacitors 131c and 132c will rapidly be brought to these $+5$ and $-5$ voltage levels in correspondence with their respective black and white signals $e_b$ and $e_w$ regardless of their previous voltage. It follows, therefore, as illustrated in graph A, that the outputs $e_{sb}$ and $e_{sw}$ of the black and white detectors 131 and 132 (which outputs $e_{sb}$ and $e_{sw}$ are nothing more than the voltages across their respective integrating capacitors 131c and 132c) will also be $+5$ and $-5$ volts, respectively, just prior to the "2" scan, as well as prior to every other scan.

During the initial period $T_1$ of the "2" scan, white is expected as indicated in graphs B and C (refer also to the "2" scan in FIG. 2), so that the black signal $e_b$ of graph B will remain at its normal value of $+5$ volts during $T_1$, while the white signal $e_w$ of graph C immediately switches to $+5$ volts. Since the black signal $e_b$ does remain at its normal $+5$ volts level during $T_1$ (as well as during any other expected white period), the voltage across the black integrating capacitor 131c will be prevented from falling below $+5$ volts because the $+5$ volts black signal $e_b$ will be continuously applied thereto through positively poled diode 131e whenever white is expected, and this is the case even if the scanning signal $e_s$ drops to the white voltage level of $-5$ volts. The output signal $e_{sb}$ from the black detector 131 will thus remain at $+5$ volts during the initial white period $T_1$ indicated in graph A. The black trigger circuit 135 (which is set to trigger at $+2.5$ volts) will thereby be prevented from triggering during expected white periods, such as $T_1$, and for this reason the black detector 131 may be considered as inactive during $T_1$ as well as during any other expected white periods.

As far as the white detector 132 is concerned, since the white voltage $e_w$ has switched from its normal voltage of $-5$ volts to $+5$ volts during $T_1$, there will no longer be any $-5$ volts acting through diode 132e to maintain the white integrating capacitor 132c at $-5$ volts. Consequently, during $T_1$ (as well as during other expected white periods) the white integrating capacitor 132c will be able to integrate the $e_s$ waveform, the white integrating capacitor 132c discharging to a less negative voltage through resistor 132d whenever the scanning signal $e_s$ becomes more positive than the voltage thereon, and charging to a more negative voltage through the diode 132a and the charging resistor 132b whenever the scanning signal $e_s$ becomes more negative than the voltage thereon. During this same expected white period $T_1$, the diode 132e of the white detector 132 will be cut off to keep the $+5$ volts to which the white signal $e_w$ has been switched from affecting this charging and discharging action of the white integrating capacitor 132c.

Consequently, it should now be evident that during the initial white period $T_1$ of the "2" scan, the black detector 131 will be inactive, while the integrating capacitor 132c of the white detector 132 will be active to integrate the value of the scanning signal $e_s$ present during $T_1$ to produce an output signal $e_{sw}$ which represents the running average of the white density in the scanning field during the $T_1$ white period of the "2" scan. For the exemplary waveform of graph A in FIG. 4, it will be seen that during the initial expected white period $T_1$, the output signal $e_{sw}$ obtained from the white detector 132 during the "2" scan with a "2" in the scanning field will, as it is to be expected, remain in the general vicinity of the white voltage level of $-5$ volts, since the scanning signal $e_s$ is essentially observing white. The white trigger circuit 136, which is set to trigger when the output signal $e_{sw}$ of the white detector 132 rises to 2.5 volts, will thereby remain untriggered. In this connection it will be noted that the integrating action of the white detector 132 prevents noise signals such as illustrated at 133 in graph A (and produced, for example, by ink splatter) from causing the white detector output signal $e_{sw}$ to rise enough to trigger the white trigger circuit 136. Also, since the output $e_{sb}$ of the black detector 131 is inactive during $T_1$, as explained above, the black trigger circuit 135 likewise remains untriggered.

During the next following period $T_2$ of the "2" scan, black is expected so that operation is reversed with respect to the black and white detectors 131 and 132, the white detector 132 now becoming inactive, while the black detector 131 becomes active to check whether the running average of the scanning signal $e_s$ is essentially black during this expected black period $T_2$. More specifically, the black signal $e_b$ switches to $-5$ volts during $T_2$ to enable the integrating capacitor 131c of the black detector 131 to now integrate the scanning signal $e_s$ and provide an integrated output $e_{sb}$ representative of this integration, while the output $e_{sw}$ of the white detector 132 is maintained at $-5$ volts as a result of the $-5$ volt white signal $e_w$ (which is switched back to $-5$ volts during $T_2$) being applied through negatively poled diode 132e to the integrating capacitor 132c. Since graph A illustrates the situation where a "2" in the scanning field is being scanned by the "2" scan of the scanning system 25 (FIG. 1), the output signal $e_{sb}$ from the black comparator 131 remains in the vicinity of +5 volts during $T_2$, considerably above the 2.5 volt triggering level of the black trigger circuit 135. As was the case for the white detector 132 during $T_1$, the integrating action of the black detector circuit 131 during $T_2$ prevents noise signals such as illustrated at 137 in graph A (which may be caused by white holes or uninked portions of the black print) from causing the signal $e_{wb}$ to fall enough below +5 volts to trigger the black trigger circuit 135.

Finally, during the last period $T_3$ of the "2" scan for which white is again expected, operation is the same as during the first white period $T_1$. The black detector 131 again becomes inactive, and because it is still being assumed that a "2" is being scanned by a "2" scan, the output signal $e_{sw}$ of the white detector 132 again remains in the general vicinity of −5 volts, considerably below the −2.5 volt triggering level. Thus, both the black and white trigger circuits 135 and 136 again remain untriggered. In summary, therefore, because the scanning signal $e_s$ in graph A of FIG. 4 is assumed to represent the scanning of a "2" in the scanning field with a "2" scan, a proper comparison is obtained during all three periods $T_1$, $T_2$, and $T_3$ of the "2" scan, as indicated in graph A by the fact that the respective output signals $e_{sb}$ and $e_{sw}$ of the black and white detectors 135 and 136 never reach the triggering levels of their respective trigger circuits 135 and 136.

Having thus explained with reference to graphs A, B, and C of FIG. 4 how the typical embodiment of the scan comparator 30 illustrated in FIG. 3 operates to prevent the production of reject signals $e_r$ when the running average of the observed scanning signal $e_s$ properly corresponds to the scan being performed, it will now be explained how reject signals $e_r$ are produced by the scan comparator 30 of FIG. 4 when such a proper correspondence is not obtained. For this purpose graphs D and E in FIG. 4 will be considered along with graphs B and C, and it will be assumed that an "8" is now in the scanning field 11 (FIG. 1), and is being scanned by the same "2" scan as before. Since the "2" scan is again assumed to be the scan being performed, the same black and white signals $e_b$ and $e_w$ illustrated in graphs B and C will again be produced by the scanning system 25 (FIG. 1). However, since an "8" is now assumed to be in the scanning field, a different scanning signal $e_s$ will be produced, as shown for example in graph D, which is the same type of graph as graph A, except that an "8" is being scanned by the "2" scan instead of a "2". By referring to the typical "2" scan shown in FIG. 2 and noting how it would traverse the digit "8," it will be understood why the scanning signal $e_s$ generally varies as shown in graph D when the digit "8" is scanned by the "2" scan.

Still referring to graph D, it will be seen that during the first expected white period $T_1$, the scanning signal $e_s$ starts out at about the white level of −5 volts, but then rises to the vicinity of the black level of +5 volts for the remainder of the $T_1$ period. The white detector 132 in FIG. 3 is active during this initial white period, $T_1$, and because the scanning signal $e_s$ remains above the triggering level of −2.5 volts for too long a time, the signal $e_{sw}$ also rises above this triggering level as shown at 141. In effect, this rise of $e_{sw}$ above the white triggering level indicates that black was observed during the "2" scan where white should have been present. The white trigger circuit 136 is thus triggered to produce an output pulse which passes through the OR gate 138 in FIG. 4 to provide a reject signal $e_r$, as illustrated in graph E. The trigger circuits 135 and 136 are each designed to trigger only once each time its respective signal $e_{sw}$ or $e_{sb}$ breaks through its respective triggering level. Thus, as indicated in graph E, only a single reject signal $e_r$ is produced as a result of the signal $e_{sw}$ having risen about its −2.5 volt triggering level as shown at 141 in graph D.

During the next period $T_2$ of the "2" scan, when black is expected, the scanning signal $e_s$ essentially indicates that it is seeing black for approximately two-thirds of the $T_2$ period so that the output signal $e_{sb}$ of the black detector 131 remains above the +2.5 volt triggering level during this time. However, it will be noted in graph D, that during the last one-third of the $T_2$ period, the scanning signal $e_s$ remains below the +2.5 volt triggering level for significant periods which results in causing the output signal $e_{sb}$ of the black comparator 131 to drop below the +2.5 volt triggering level, as shown at 142 in graph D, thereby triggering the black trigger circuit 135 to produce another reject signal $e_r$.

During the last period $T_3$ of the "2" scan, for which white is expected, the white detector 132 again comes into operation, and because the observed scanning signal $e_s$ again does not properly compare with what is expected, the output signal $e_{sw}$ again rises above the −2.5 volt triggering level, as indicated at 143, to produce still another reject signal $e_r$. In summary of graphs C and D of FIG. 4, therefore, it will be understood that because at least one reject signal $e_r$ is produced when an "8" is scanned with a "2" scan, an improper comparison is indicated and the respective $I_2$ identity flip-flop in FIG. 1 will be turned "off" to indicate that the character in the scanning field is not a "2."

Before leaving this discussion of the specific embodiment of the scan comparator shown in FIG. 3, it is to be understood that the integrating capacitors and the discharging and charging resistors of the black and white detectors 131 and 132, the triggering levels of the trigger circuits 135 and 136, the scanning rate provided by the scanning system 25 (FIG. 1), and the particular unique scanning paths provided for each character (FIG. 2), are all suitably chosen so as to provide the greatest discrimination between characters, taking into account the print and paper quality, as well as noise problems.

SCANNING SYSTEMS

Now that the overall construction and operation of the invention has been described, as well as a typical specific embodiment of the scan comparator 30 of FIG. 1, the remaining portion of this description will be devoted to the description of two illustrative embodiments of the scanning system 25 of FIG. 1. First, a scanner embodiment will be considered in which the character contour scans are performed optically using a cathode ray tube. Secondly, an electronic scanning embodiment will be considered in which the character contour scans are performed electronically by forming an electronic image of the character which is then scanned electronically in accordance with the character contour scans. It is to be understood that these two scanning system embodiments are only illustrative, and any other scanning system may be employed which will provide the required character contour scans, as described in connection with FIG. 1.

OPTICAL CONTOUR SCANNING EMBODIMENT

(FIGS. 5–12)

Figure 5:
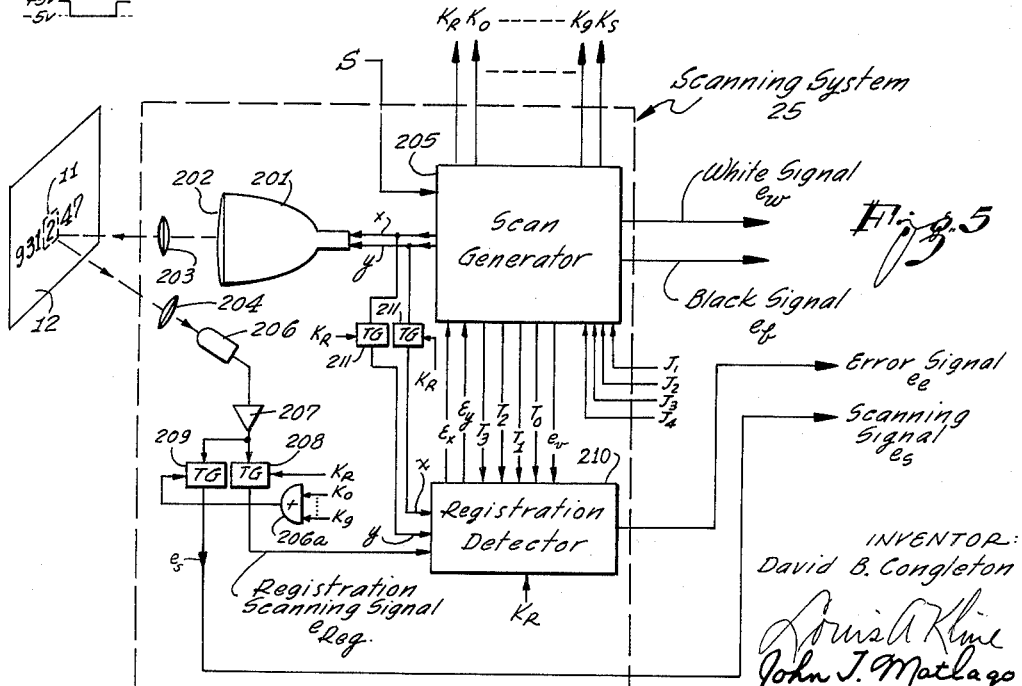
FIG. 5 is a block and circuit diagram of a typical embodiment of the scanning system 25 of FIG. 1 in which the character contour scans are performed optically.

Referring to FIG. 5, a typical embodiment of the scanning system 25 of FIG. 1 is illustrated in which the character scans are performed optically using a conventional cathode ray tube 201. The cathode ray tube 201 is provided with horizontal and vertical deflection plates (not shown) to which $x$ and $y$ signals are respectively fed from a scan generator 205 so as to cause the cathode ray tube 201 to provide the desired traces on its screen 202 in accordance with the character scans, such as shown in FIG. 2. Using a suitable optical system 203, light from the screen 202 is projected onto a designated scanning field 11 of a character bearing sheet 12. The resulting light reflected from the scanning field portion of the sheet 12 is passed through another suitable optical system 204 to a photodetector 206, and then to an amplifier 207, which may include automatic gain control means for providing a desired peak-to-peak voltage, such as the +5 to −5 peak-to-peak voltage assumed for the typical embodiment of the scan comparator 30 of FIG. 3. The amplifier 207 may also include suitable clipping and limiting means for eliminating paper noise and for overcoming other noise disturbances. Such means are well within the skill of those in the art.

During the registration count $K_R$, the output of amplifier 207 is fed through a transmission gate 208 to form a registration scanning signal $e_{Reg}$ for feeding to a registration detector 210, and during the character scan counts $K_0$ to $K_9$, the output of amplifier 207 is fed through a transmission gate 209 to form the scanning signal $e_s$ which is fed to the scan comparator 30 as shown in FIG. 1. It is to be noted that transmission gates, such as indicated at 208 and 209 in FIG. 5, perform similarly to the AND gates in FIG. 1, except that the transmission gate, when opened, transmits a signal applied thereto essentially unchanged with all of its amplitude variations, such as the signal at the output of amplifier 207 in FIG. 5. On the other hand, an AND gate normally assumes a binary system in which only signals of two levels are applied thereto. For this reason, a distinction has been made between the two and, hereinafter, a transmission gate will be indicated in the drawings (by a block labeled TG) whenever a signal is to be transmitted unchanged, and the AND signal notation of FIG. 1 will be continued to be used only in connection with binary signals. As far as the signal which opens the transmission gate is concerned, it will still be assumed that a "true" signal is required for maintaining the transmission gate open. Consequently, the gate opening signals may be derived from binary OR and AND gates, as is done, for example, using OR gate 206a with transmission gate 209 in FIG. 5.

Continuing with the description of the optical contour scanning embodiment of the scanning system 25 shown in FIG. 5, it will be understood that during the registration scan $K_R$, the scan generator 205 may be caused to generate $x$ and $y$ signals so as to produce special registration scans which are in addition to and precede the ten character contour scans of FIG. 2. These registration $x$ and $y$ signals are fed to the registration detector 210 (through respective transmission gates 211), and are used thereby along with the resultant output produced in response thereto from the amplifier 207 during count $K_R$, for the purpose of providing bias signals $E_x$ and $E_y$ which correspond to the $x$ and $y$ positioning of the character in the scanning field 11. These bias signals $E_x$ and $E_y$ are fed to the scan generator 205 for use in properly positioning the character contour scans to follow during counts $K_0$ to $K_9$ with respect to the position of the character in the scanning field 11. If registration cannot be obtained for some reason, the registration detector 210 will produce an error signal $e_e$ which is used as described in connection with FIG. 2, to provide an unreadable character indication.

After the scan generator 205 has generated this registration scan, and the registration detector 210 has produced the bias signals $E_x$ and $E_y$, the scan generator 205 then leaves count $K_R$ and proceeds through counts $K_0$ to $K_9$ to provide $x$ and $y$ signals to the cathode ray tube 201 for the performance of the ten character scans, such as illustrated in FIG. 2. In addition, for each character scan, the scan generator 205 also produces the black and white signals $e_w$ and $e_b$ required for comparison with their respective scanning signal $e_s$, as previously described in connection with FIGS. 3 and 4.

Figure 6:
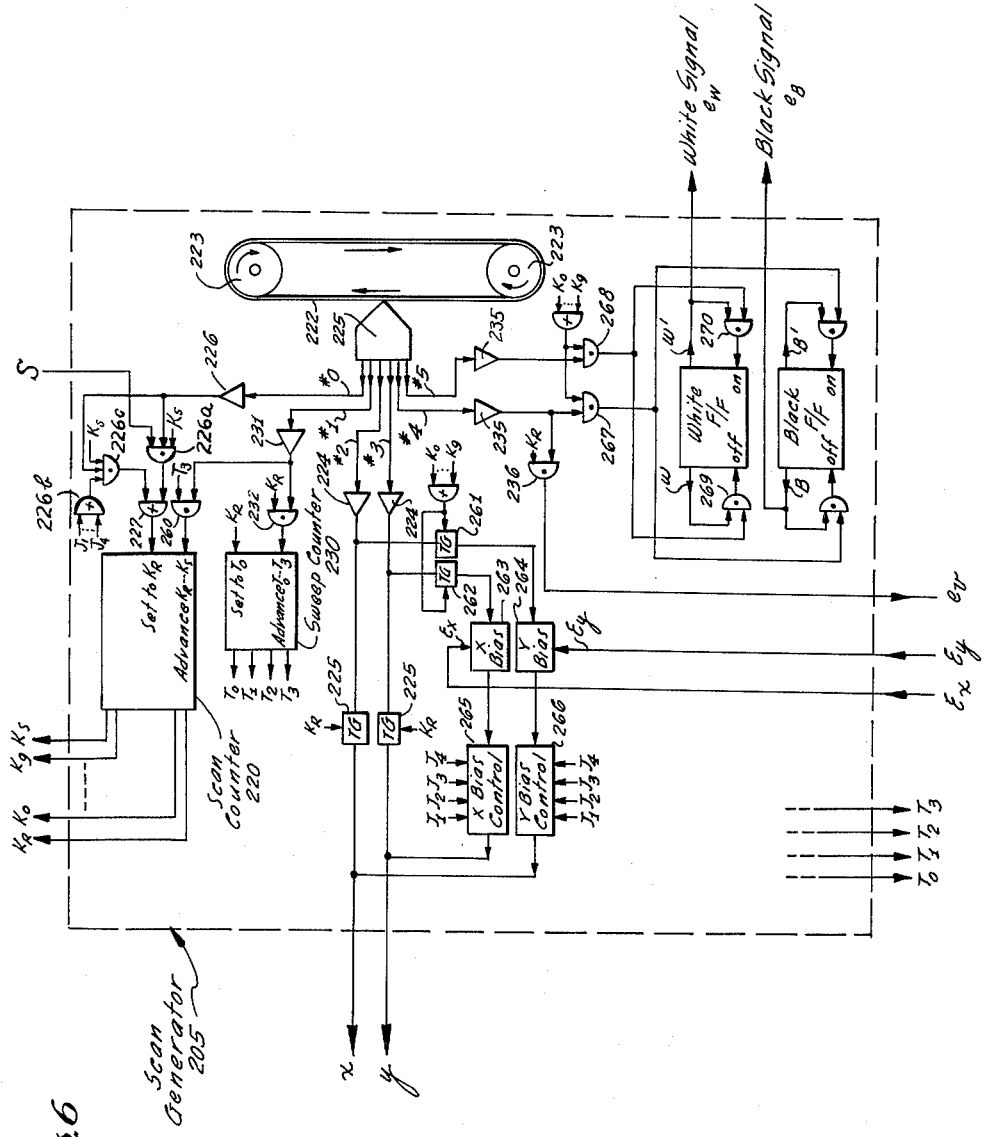
FIG. 6 is a block and circuit diagram of a typical embodiment of the scan generator 205 of FIG. 5.

Referring now to FIGS. 5 and 6, typical specific embodiments are illustrated of the scan generator 205 and the registration detector 210 shown in FIG. 5. The scan generator 205 of FIG. 6 will be considered first, and it will be described how suitable $x$ and $y$ signals may be provided for feeding to the cathode ray tube 201 in FIG. 5 for performance of the registration scans and the ten character contour scans. Data necessary in providing these $x$ and $y$ signals is pre-recorded on a suitable loop of tape 222 which is driven by rollers 223 in any convenient manner. The tape is provided with six individual channels #0 to #5 and the data stored therein is converted into electrical form using a multi-channel pick-up head 225. It will be appreciated that data may be stored on the tape in magnetic or optical form and the pick-up head 225 may accordingly be of the magnetic or optical type. In either case, data recorded on the tape 222 can be pre-recorded in any desired manner so as to permit generation of suitable $x$ and $y$ signals as required by the registration and character scans. The signals obtained at the output of the head 225 as a result of the data pre-recorded in each channel of the tape 222 are illustrated in the graphs of FIG. 8 which will be referred to whenever helpful during the course of the description.

From the previous description of FIG. 1, it will be remembered that the scanning system 25 remains in the last count $K_s$ until a start signal S is produced by the paper handler 10 to set the system back to the registration count $K_R$ and thereby initiate the recognition procedure on a new character moved into the scanning field. In the embodiment of the scan generator 205 of FIG. 6, this is accomplished in proper synchronized relation with the rotation of the tape 222 by providing a single pulse in channel #0 for each complete rotation of the tape (as shown in FIG. 8), which pulse is amplified and shaped by a suitable amplifier 226 and is then applied along with the start signal S and the last count $K_s$ to an AND gate 226a, whose output is in turn fed to the "Set to $K_R$" input of a scan counter 220 through an OR gate 227. The scan counter 220 is constructed and arranged to provide the registration count $K_R$, the character scan counts $K_0$ to $K_9$, and the final count $K_s$. It will be understood, therefore, that when the scan counter 220 is in its last count $K_s$ and the start signal S is produced, the next appearing channel #0 pulse will cause AND gate 227 to become "true" to set the scan counter 220 to its registration count $K_R$, thereby initiating the registration procedure in proper synchronism with the tape 222. It will be understood that the start signal S is of sufficient duration so as to remain present until a pulse appears in channel #0 to initiate the recognition procedure.

In addition to the scan counter 220, a sweep counter 230 is provided in FIG. 6 which is set to its initial count $T_0$ by the registration count $K_R$, and is advanced by pulses provided in channel #1 of the tape 222 which are fed through amplifier 231 and AND gate 232 to the "Advance $T_0 \ldots T_3$" input of the sweep counter 230. The registration count $K_R$ is also applied to AND gate 232 so that when the scan counter 220 is reset to $K_R$ by the pulse in channel #0, the sweep counter 230 will be enabled to advance in response to pulses provided from channel #2. The pulses provided in channel #1 during the registration count $K_R$ (which are the only pulses in channel #1 of interest at this time) are illustrated in FIG. 8 along with the count of the sweep counter 230. It is during these counts $T_0$, $T_1$, $T_2$, and $T_3$ of the sweep counter 230 that suitable registration scans are produced to permit the registration detector 210 to register the character in the scanning field with respect to the ten character scans to follow during counts $K_0$ to $K_9$ of the scan counter 220, as will now be described.

In order to permit the cathode ray tube 201 in FIG. 5 to perform the registration scans which will be used by the registration detector 210 in registering a character, suitable pre-recorded signals are provided in channels #2 and #3 of the tape 222 in FIG. 6 which are fed through respective amplifiers 224 and transmission gates 225 (during the registration count $K_R$) to form the required registration $x$ and $y$ signals for the cathode ray tube 201. Referring again to FIG. 8, the graphs corresponding to channel #2 and channel #3 respectively illustrate typical pre-recorded signals which may be provided for performing registration scans during counts $T_0$ to $T_3$ of the sweep counter 230, the resulting scan provided during each of the counts $T_0$ to $T_3$ being illustrated in FIGS. 9–12, respectively.

The description of the scan generator 205 of FIG 6 will now be interrupted in order to explain the specific manner in which registration is accomplished by the registration detector 210 shown in FIG. 7 using the $x$-$y$ registration signals and the observed registration scanning signal $e_{\text{Reg}}$, both of which are fed to the registration detector 210 during the registration count $K_R$. Before leaving FIG. 6, however, the output from channel #4 should be noted which provides, as indicated in FIG. 8, a plurality of pulses $e_v$ occurring at the beginning of each sweep across a character, whether the sweep is horizontal or vertical. For example, in the $T_0$ scan shown in FIG. 9, a pulse is provided each time a sweep is started at the extreme left of the figure. The resultant $e_v$ pulses are then obtained in FIG. 6 by feeding the channel #4 output of the pick-up head 225 through a suitable amplifier 235 and an AND gate 236 to which the registration count $K_R$ is also fed. These $e_v$ pulses are then fed to the registration detector 210 as shown in FIG. 5 in order to synchronize operations thereof with each sweep of the registration scans, as will now become evident from the following description of the specific embodiment of the registration detector illustrated in FIG. 7.

Thus, turning to FIG. 7, the observed registration scanning signal $e_{\text{Reg}}$ (which is the scanning signal observed during the registration scans) is applied to a detector circuit 240 which is of the same general type as the white detector 132 used in the scan comparator 30 in FIG. 3, and operates in the same general manner. More specifically, the output of the detector 240 is normally held at the white voltage level of $-5$ volts by the output $Q'$ of a one-shot $Q$ which is at $-5$ volts when the one-shot is "off." The pulse $e_v$ is applied to the "on" input of one-shot $Q$ so that, at the start of each sweep across a character, the one-shot $Q$ will be triggered "on" causing the output $Q'$ thereof to switch from $-5$ volts to $+5$ volts and thereby permit the detector 240 to integrate the registration scanning signal $e_{\text{Reg}}$ during each sweep. The one-shot $Q$ remains "on" for a sufficient time to permit the sweep to traverse any character which may be in its path. By suitable choice of the values of the components of the detector 240, the output $e_{Rt}$ from the detector 240 may be caused to rise to the $-2.5$ volt triggering level of the registration trigger circuit 241 only if sufficient black is seen during a sweep to indicate that a portion of a character has been traversed during the sweep.

The registration trigger 241 in FIG. 7 may be of the same general type as the white trigger circuit 136 of the scan comparator 30 of FIG. 3, except that once the registration trigger 241 triggers, it is not able to be triggered again until reset by the next start sweep pulse $e_v$, the output of the registration trigger 241 remaining "true" until the registration trigger 241 is reset. Consequently, whenever a sweep traverses a character, the detector output $e_{Rt}$ will rise above $-2.5$ volts, and the output of the registration trigger 241 will become "true" and remain "true" until reset by the next start sweep pulse $e_v$.

As shown in FIG. 7, the output of the registration trigger 241 is fed to the "Advance" input of a registration counter 242. In order to assure that the registration counter 242 is at zero at the start of each of the $T_0$ to $T_3$ scans illustrated in FIGS. 9–12, each of the counts $T_0$ to $T_3$ is fed to the "Reset" input of the registration trigger 242 through an OR gate 242a. Then, the first time that a sweep traverses a character during one of the $T_0$ to $T_3$ scans (and thereby triggers the registration trigger circuit 241) the registration counter 242 will be advanced to its first count $R_1$. On the next sweep, if the registration trigger 241 is not turned "true" again, as it should once a sweep traverses a character, then the registration counter 242 will automatically be reset back to zero by the next sweep start signal $e_v$ which is applied to the "Reset" input of the registration counter 242 by way of AND gate 243 and OR gate 244. It will be noted that AND gate 243 is also fed the first count $R_1$ from the registration counter 242 as well as the inverted output of the registration trigger 241. Consequently, if the registration counter 242 is in count $R_1$, and the registration trigger 241 does not become "true" during the next sweep, the inverted output thereof will be "true" when the next start sweep signal $e_v$ appears, causing AND gate 243 to become "true" to reset the registration counter 242 back to zero. This resetting of the registration counter 242 is provided to prevent a scratch, blot or mark on the paper which may not appear on the next sweep from prematurely advancing the registration counter 242. It is to be understood that the registration trigger 241 may be suitably designed to be reset in response to the trailing edge of the pulse $e_v$, rather than the leading edge, in order to permit a "true" signal appearing at the output of the registration trigger 241 at the end of a sweep to remain for a sufficient time to prevent resetting of the registration counter 242 back to zero.

Assuming that two successive sweeps do traverse a character, the registration counter 242 will then reach its final count $R_2$, which is fed to four AND gates 245, each of which has a respective one of the sweep counts $T_0$ to $T_3$ applied thereto, the outputs of these AND gates 245 being in turn fed to the "on" inputs of respective $Y_1$, $Y_2$, $X_1$ and $X_2$ flip-flops. Thus, during each of the periods $T_0$, $T_1$, $T_2$ and $T_3$ a respective one of these flip-flops will be turned "on" at the particular time when the registration counter 242 reaches $R_2$ during that period. It will be noted in FIG. 7 that these $Y_1$, $Y_2$, $X_1$ and $X_2$ flip-flops are all turned "off" by the leading edge of the registration count $K_R$, which is done in order to make sure that they are all in their "off" state in preparation for the registration scans to be performed during counts $T_0$ to $T_3$. It will also be noted in FIG. 7 that the primed outputs $Y_1'$, $Y_2'$, $X_1'$ and $X_2'$ of these flip-flops are fed to an OR gate 250 and then to an AND gate 251 to which the inverse of the registration count $K_R$ is also fed, the output of the AND gate 251 (when "true") then constituting the error signal $e_e$. This is done to take care of the situation where, for some reason, the registration counter 242 is not able to reach $R_2$ during one or more of the registration scans $T_0$ to $T_3$, in which case one or more of the $Y_1$, $Y_2$, $X_1$ or $X_2$ flip-flops will not be "on" when the time allotted for the registration count $K_R$ is over. The error signal $e_e$ thereby produced indicates that registration could not be obtained for the character presently in the scanning field, and results in an unreadable character indication being provided as previously described in connection with FIG. 1.

Having described how the various flip-flops $Y_1$, $Y_2$, $X_1$ and $X_2$ are turned "on" at the instant that a character is detected twice by two successive sweeps during each of the respective scans $T_0$, $T_1$, $T_2$, or $T_3$, it will now be described how the turning "on" of each of these flip-flops is used to obtain the bias signals $E_y$ and $E_x$ for use in registering the character in the scanning field with respect to the ten character contour scans to follow during counts $K_0$ to $K_9$. It will be seen in FIGS. 5 and 7 that the same $x$ and $y$ signals which produce the registration scans illustrated in FIGS. 9–12 are fed to the registration detector 210 during the registration count $K_R$, as well as to the cathode ray tube 201. The registration detector 210 is then able to record the particular voltage of each of the $y$ and $x$ signals at the instant that the registration counter 242 reaches $R_2$ during each of the scans $T_0$, $T_1$, $T_2$ and $T_3$, and these voltages are in turn used to provide the bias signals $E_x$ and $E_y$. More specifically, these $y$ and $x$ registration scan signals applied to the registration detector 210 in FIG. 7 are fed to respective pairs of transmission gates (252 and 253 for the $y$ signal, and 254 and 255 for the $x$ signal). Each transmission gate is opened at the beginning of its respective sweep period $T_0$, $T_1$, $T_2$, or $T_3$, and is closed at the instant that its respective flip-flop $Y_1$, $Y_2$, $X_1$ or $X_2$ becomes "true," since the respective output $Y_1'$, $Y_2'$, $X_1'$ or $X_2'$ will then become "false." The output of transmission gates 252, 253, 254 and 255 are fed to respective peak detector capacitors 252a, 253a, 254a, and 255a, each of which follows the peak of its respective $y$ or $x$ sweep signal applied thereto during its respective scan $T_0$, $T_1$, $T_2$ or $T_3$, and remains at the voltage present thereon at the instant that its respective transmission gate is closed by its respective flip-flop $Y_1$, $Y_2$, $X_1$, or $X_2$ being turned "on." It will be understood, therefore, that after completion of the registration scans illustrated in FIGS. 9–12, each of the peak detector capacitors 252a, 253a, 254a and 255a will contain a voltage which corresponds to the magnitude which its respective sweep signal had at the instant that the registration counter 242 reached $R_2$ during its respective scan $T_0$, $T_1$, $T_2$, or $T_3$. An average is then taken of the voltages on each pair of peak detector capacitors (252a and 253a for $y$ and 253a and 254a for $x$) using equal resistors connected in series thereacross (252b and 253b for capacitors 252a and 253a and 254b and 255b for capacitors 254a and 255a), the junctions between the pairs of resistors being connected to respective cathode followers 256 and 257 whose outputs will then represent the bias signals $E_y$ and $E_x$.

Using the $T_0$ and $T_1$ scans as an example of the above operation, it will be understood that the transmission gate 252 will be opened at the start of the $T_0$ scan to permit the peak detector capacitor 252a to follow the voltage of the sweep signal $y$ as it slowly decays in performing the $T_0$ scan, as indicated in FIGS. 8 and 9. When the registration counter 242 in FIG. 7 reaches count $R_2$, the $Y_1$ flip-flop in FIG. 7 is turned "on" to cause its unprimed output $Y_1'$ to become "false," and thereby close the transmission gate 252, whereupon the capacitor 252a will remain at the $y$ sweep voltage occurring at the time that the registration count $R_2$ is reached. Similarly, during the $T_1$ scan, when the registration count $R_2$ is reached, the transmission gate 253 will close and the capacitor 253a will remain at the $y$ sweep voltage occurring when $R_2$ is reached during $T_1$. The resistors 252b and 253b will then provide at their junction a voltage equal to the average between the voltages on capacitors 252a and 253a, which is fed to a cathode follower 256 whose output then serves as the registration bias voltage $E_y$. The registration bias voltage $E_x$ is obtained in a similar manner during periods $T_2$ and $T_3$ using transmission gates 254 and 255, peak detector capacitors 254a and 255a, resistors 254b and 255b, and cathode follower 257. It will be appreciated that the resistors 252b, 253b, 254b and 255b and their respective peak detector capacitors 252a, 253a, 254a and 255a are suitably chosen in conjunction with the input impedances of the cathode followers 256 and 257 so that the bias voltages $E_x$ and $E_y$ will remain substantially constant throughout the character contour scans following during counts $K_0$ to $K_9$.

Returning now to the specific embodiment of the scan generator 205 shown in FIG. 6 with additional reference to the channel #1 graph of FIG. 8, it will be seen that after count $T_3$ is reached, a series of pulses are provided in channel #1 which are fed to the "advance $K_R$ to $K_S$" input of the scan counter 220 by way of amplifier 231 and AND gate 260 and serve to advance the scan counter 220 to counts $K_0$ to $K_9$ and then to the final count $K_S$, the appropriate periods being designated in FIG. 8. During the counts $K_0$ to $K_9$, the scan generator 205 is caused to generate the required character contour scans such as illustrated in FIG. 2. This is accomplished by providing pre-recorded data in channels #2 and #3 of the tape 222 during corresponding counts $K_0$ to $K_9$ which, when read by the pick-up head 225 and fed to the cathode ray tube 201 in FIG. 5, will generate on the face 202 thereof the character contour scans desired for each of the counts $K_0$ to $K_9$. The channel #2 and #3 graphs in FIG. 8 illustrate typical signals which may be caused to appear at the output of the pick-up head 225 during counts $K_0$ to $K_9$ for producing the various character contour scans shown in FIG. 2.

Still referring to the scan generator 205 of FIG. 6, it will be seen that the resultant channel #2 and #3 signals apearing at the outputs of the amplifiers 224 (which are to serve as the $x$ and $y$ signals during counts $K_0$ to $K_9$), are fed through respective transmission gates 261 and 262, then through respective $x$ bias and $y$ bias networks 263 and 264, and finally through respective $x$ bias control and $y$ bias control networks 265 and 266 to respective $x$ and $y$ inputs of the cathode ray tube 201 in FIG. 5. The $x$ bias and $y$ bias networks 263 are respectively fed by the registration bias signals $E_x$ and $E_y$ from the registration detector 210 and serve to apply appropriate bias levels to the respective $x$ or $y$ signals so that the character scans will be properly positioned with respect to the positioning of the character in the scanning field, as detected by the registration detector 210.

The $x$ bias control and $y$ bias control networks 265 and 266 in FIG. 6 are additionally provided in series with the $x$ and $y$ signals in order to permit different biases to be introduced into the $x$ and/or $y$ signals during different counts $J_1$, $J_2$, $J_3$ and $J_4$ of the reject counter 65 (FIG. 1), whereby a different registration may be provided for each of the four additional tries which may be made by the scanning system 25 to recognize a character, as previously described in connection with FIG. 1. It is to be noted in FIG. 6 that the counts $J_1$ to $J_4$ are fed through OR gate 226b and AND gate 226c to the "Set to $K_R$" input of the scan counter 220. This is done to permit the entire recognition procedure just described to be repeated for each of the counts $J_1$ to $J_4$, including the registration procedure during which the registration biases $E_x$ and $E_y$ are provided. It will be understood that since the single pulse in channel #0 is also fed to AND gate 226c along with the $J_1$ to $J_4$ outputs of OR gate 226b and the last count $K_s$, the proper synchronization with the movement of the tape 222 will be obtained during each new try at reading the character. The registration procedure is repeated for each try in order to permit new registration biases $E_x$ and $E_y$ to be provided in the event the character may have moved somewhat since the previous try.

The only remaining portion of the scan generator 205 of FIG. 6 which is still to be considered relates to the specific manner in which the white signal $e_w$ and the black signal $e_b$ are generated for each of the character scans. The production of these signals is quite straight-forward. Channels #4 and #5 on the tape 222 are provided with suitably spaced pulses during each of the counts $K_0$ to $K_9$ (see FIG. 8) which are fed by way of respective amplifiers 235 and AND gates 267 and 268 to the "on" and "off" inputs of a black flip-flop and a white flip-flop in a manner which causes these flip-flops to be switched in accordance with the black and white signals $e_b$ and $e_w$ required for each of the counts $K_0$ to $K_9$. In accordance with the assumption made for the scan comparator 30 of FIG. 3, the "true" and "false" levels of the white and black flip-flops in FIG. 6 may be designed to be $+5$ and $-5$ volts, respectively. It will be noted in FIG. 8 (as well as in FIG. 2) that each of the ten character scans begins and ends with an expected white period. Conseqently, in order to assure that the integrating capacitor of the white detector 132 in the scan comparator 30 of FIG. 3 starts at $-5$ volts at the beginning of each scan the white flip-flop (as is desired in the specific embodiment of the scan comparator 30 illustrated in FIG. 3) is momentarily switched "off" to return W to its $-5$ volt level just prior to the end of each scan, as indicated in FIG. 8.

ELECTRONIC CONTOUR SCANNING EMBODIMENT

*(Figs. 13–19)*

Figure 13:
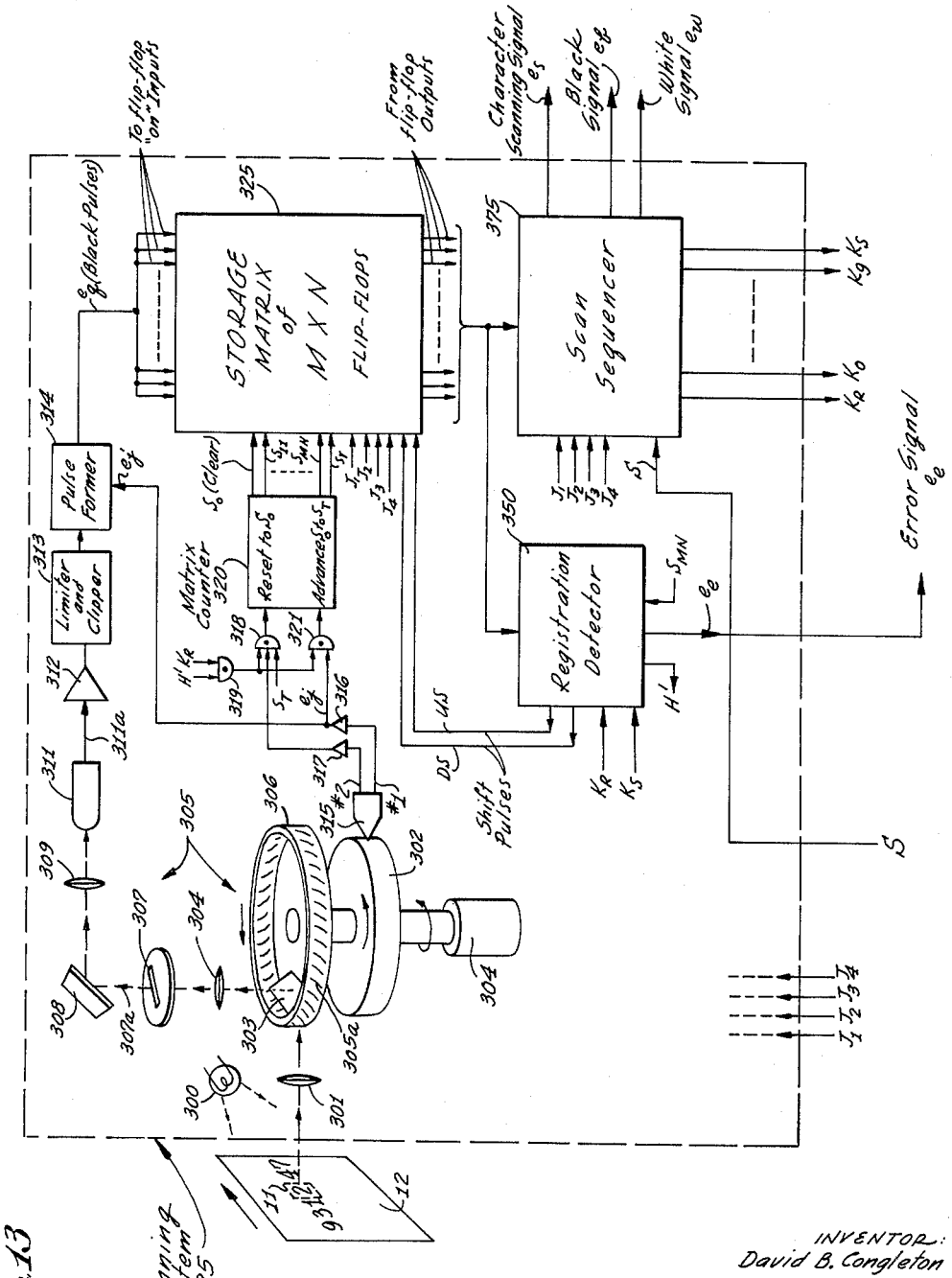
FIG. 13 is a block and circuit diagram of a typical embodiment of the scanning system 25 of FIG. 1 in which the character contour scans are performed electronically.

An electronic contour scanning embodiment of the scanning system 25 of FIG. 1 is illustrated in FIG. 13, a brief description of which will first be given in order to set the stage for the more detailed description to follow. The sheet 12 containing the characters to be read is suitably moved at a continuous rate and suitable bar-helix drum scanning means, indicated generally at 305, serves to scan the scanning field 11 with a plurality of spaced vertical scans as illustrated, for example, in FIG. 14. The black and white portions observed in the scanning field 11 during the scan are converted into electrical signals by a photodetector 311 and are fed to a storage matrix 325 to form an electronic image of the character in the scanning field 11. Once such an electronic image of a character has been properly set up and registered in the storage matrix 325 with the aid of a matrix counter 320 and a registration detector 350, a scan sequencer 375 then serves to scan the matrix 325 in a predetermined manner so as to effectively perform each of the character scans (such as illustrated in FIG. 2) and thereby produce the desired character scanning signal $e_s$ as well as appropriate black and white signals $e_b$ and $e_w$ for feeding to the scan comparator 30 (FIG. 1).

With the above broad description of FIG. 13 as a background, the specific operation of FIG. 13 will now be considered in more detail. A light source 300 serves to illuminate at least the scanning field 11 portion of the sheet 12 and an image of the scanning field 11 is formed by a suitable optical system 301 on the periphery of a drum 306 of the bar-helix drum scanning means 305, the drum 306 being continuously rotated by a suitable motor 304. Helical slots 305a are provided in the drum periphery and light passing through each such helical slot as it traverses the image of the scanning field on the drum periphery is imaged on a bar 307 by way of mirror 303 and a suitable optical system 304. It will be understood that by suitable arrangement of the helical slots 306a and the bar 307, and by proper choice of the speed of rotation of the drum 306 and the speed of travel of the paper 12, the optical output 307a from the bar 307 may be made to correspond to the scan illustrated in FIG. 14. This optical output 307a from bar 307 is fed to the photodetector 11 to provide a signal 311a which will then represent the instantaneous black-white level obtained during each point in the scanning field 11 as it is being scanned. The output signal 311a from the photodetector 311 is then fed through a suitable amplifier 312 to a limiter and clipper 313 to eliminate various noise effects. The output of the limiter and clipper 313 is then fed to a pulse former 314 along with sampling pulses $e_j$ which are synchronized with the rotation of the drum 306. These sampling pulses $e_j$ may conveniently be derived by providing a second drum 302 rotating on the same shaft as the drum 306, and provided with a cylindrical magnetic strip on its periphery in which the pulses $e_j$ may be stored in a first channel #1 thereof. A magnetic head 315 may then be provided to read these pulses $e_j$ and feed them through a suitable amplifier 316 to the pulse former 314.

The pulse former 314 is constructed and arranged to produce an output pulse $e_q$ only when the output of the limiter and clipper 313 during a sampling pulse $e_j$ indicates that black is presently being seen in the scanning field 11. Thus, during the scan of a character, such as illustrated in FIG. 14, a pulse $e_q$ is obtained at the output of the pulse former 314 whenever a sampling pulse $e_j$ occurs and the output of the limiter and clipper 313 indicates that black is being seen in the scanning field 11 at that time.

The magnetic strip on the periphery of drum 302 also provides a second channel #2 which contains pulses for synchronizing the start of the FIG. 14 scan with the electronic circuitry, a single pulse being provided whenever a complete scanning such as illustrated in FIG. 14 is begun. As indicated in FIG. 13, these synchronizing pulses in channel #2 are fed through a suitable amplifier 317 and an AND gate 318 to the "Reset to $S_0$" input of the matrix counter 320. Thus, when the scan sequencer 375 is reset to the registration count $K_R$ by the start signal S from the paper handler 10 (FIG. 1), the AND gate 318 will become "true" ($K_R$ and H' both being true at the start of $K_R$) to permit the next occurring pulse in channel #2 to reset the matrix counter 220 from its last count $S_T$ to its initial count $S_0$. Between counts $S_0$ and $S_T$ the matrix counter 320 is provided with counts $S_{11}$ to $S_{MN}$ which communicate with the inputs of respective ones of the MN flip-flops in the storage matrix 325, and serve to steer black pulses $e_q$ appearing at the output of the pulse former 314 into respective flip-flops in the storage matrix 325 in accordance with the area in the scanning field to which each flip-flop corresponds. As a result, an electronic image of the scanning field in the storage matrix 325 is formed for each cycling of the matrix counter 220, the advancement of the matrix counter 320 through its counts from $S_0$ to $S_T$ being accomplished by feeding the same sampling pulses $e_j$ which are fed to the pulse former 314 to the "Advance $S_0$ to $S_T$" input of the matrix counter 320 by way of AND gate 321.

The storage matrix 325 continues to form an electronic image of the scanning field 11 for each cycling of the matrix counter 320 from counts $S_0$ to $S_T$, the initial count $S_0$ serving to clear the matrix for the next image to be formed therein. Each image formed in the matrix 325 is applied to the registration detector 350 by feeding the outputs of the matrix flip-flops thereto. The registration detector examines each image at count $S_{MN}$ of the matrix counter 320 (when the full image is formed) to determine whether the character on the continuously moving sheet 12 has moved to a proper horizontal registration position in the scanning field 11. When proper horizontal registration is recognized by the registration detector 350, the signal H' therefrom becomes "false" to cause AND gate 319 to become "false" and thereby prevent the scan synchronizing pulses in channel #2 from resetting the matrix counter 320. As a result, the matrix counter 320 remains in its last count $S_T$ and the storage matrix 325 thereby retains the electronic image which was found by the registration detector 350 to have the desired horizontal registration. From then on, any further optical scanning of the character is ignored, and the system works with the electronic image set up in the matrix 325 for the remainder of the recognition procedure. The system is, of course, designed so that the entire recognition procedure (including additional tries at recognition) is completed before the next start signal S occurs indicating that a new character is ready for scanning.

Having set up an electronic image in the matrix 325 which has the proper horizontal registration, the next step is to provide proper vertical registration of the electronic image in the matrix 325. This is also accomplished by the registration detector 350, which detects the vertical registration of the electronic image, and provides either upshift pulses US or downshift pulses DS which are applied to the storage matrix 325 (as indicated in FIG. 13) to electronically shift the image therein either upward or downward, as is necessary to obtain the proper vertical registration.

Continuing with the description of the electronic contour scanning embodiment shown in FIG. 13 it will be understood that the time duration of the registration count $K_R$ during which the above operations occur may conveniently be determined by the scan sequencer 375. If proper horizontal and/or vertical registration is not obtained by the time that the scan sequencer 375 leaves count $K_R$ to begin the character contour scans, then the error signal $e_e$ may be produced by the registration detector 350 and will then serve as described in connection with FIG. 1, to provide an unreadable character indication.

Upon leaving the registration count $K_R$, the scan sequencer 375 advances to counts $K_0$ to $K_9$ during which the storage matrix flip-flops are sequenced in accordance with the ten character contour scans illustrated in FIG. 2, the rate of scanning being chosen so as to produce a composite character scanning signal $e_s$ which is essentially of the same general type as obtained from the optical contour scanning embodiment of FIG. 5. Also, during counts $K_0$ to $K_9$ the scan sequencer 375 generates the black and white signals $e_b$ and $e_w$ required during each of the ten character scans, these black and white signals $e_b$ and $e_w$ being fed along with the character scanning signal $e_s$ to the scan comparator 30 as shown in FIG. 1.

With the general arrangement of the electronic matrix scanning approach having been described with reference to FIGS. 13 and 14, specific illustrative embodiments of the storage matrix 325, the registration detector 350 and the scan sequencer 375 will now be presented, it being understood that these embodiments are only illustrative of varoius embodiments which could be provided.

Referring first to FIG. 15, the basic matrix arrangement of M$x$N flip-flops is illustrated, it being assumed for exemplary purposes that M is 20 and N is 14, the matrix thereby having 20 M rows numbered from top to bottom in FIG. 15, and 14 N columns numbered from left to right. Each matrix flip-flop may then be designated in accordance with its location with respect to the M rows and N columns. For example, the flip-flop in the third row and fourth column would be designated $M_3N_4$. FIG. 15 also illustrates how the digit "2" might appear in this matrix after being properly registered therein, the shaded blocks in FIG. 15 indicating those flip-flops which are "on," while the unshaded blocks indicating those flip-flops which are "off."

Obviously, the greater the number of flip-flops provided in the matrix, the more closely the electronic image will correspond to the character in the scanning field. It will be appreciated, therefore, that the choice of matrix size will be a compromise between the size and expense involved and the number of flip-flops needed for proper recognition. It will further be noted in FIG. 15 that the numbers 1 to 36 are provided in various flip-flop blocks of the matrix. This is done to illustrate how the scan sequencer 375 might cause the outputs of the storage matrix flip-flops to be sequenced during the performance of the typical #2 scan illustrated in FIG. 2. The scans for other characters in the font may be provided in a similar manner by other suitable sequences.

Referring now to FIG. 16, a typical embodiment of the registration detector 350 of FIG. 13 is illustrated, and will be used to explain how vertical and horizontal registration may typically be achieved as generally described above. The approach employed by the registration detector 350 in FIG. 16 for achieving registration may be referred to as the "center of black" approach. More specifically, the "center of black" approach registers the character in the scanning field so that horizontal registration is considered achieved when there is as much black on the left side of the scanning field as there is on the right side of the field, and vertical registration is considered achieved when there is as much black on the top half of the scanning field as there is on the bottom half of the field. In terms of the matrix 325 illustrated in FIG. 15, this means that horizontal registration is considered achieved when there are as many flip-flops "on" to the left of the horizontal registration reference line as are "on" to the right of the line, and vertical registration is considered achieved when there are as many flip-flops "on" above the vertical registration reference line as are "on" below the line.

With the above brief summary of "center of black" approach employed by the registration detector 350 of FIG. 16 in mind, the operation of the registration detector 350 will now be considered in detail. It will be seen in FIG. 16 that the left-side flip-flop outputs are summed and fed to one input of a differential amplifier 351, while the right-side flip-flop outputs are summed and fed to the other input of the differential amplifier 351, the differential amplifier 351 serving to compare the total number of flip-flops which are "on" on each of the left and right sides of the matrix 325.

As a character moves across the scanning field during the registration count $K_R$, the matrix counter 320 in FIG. 13 will continue to cycle and form an image of the scanning field in the matrix 325, as pointed out previously. At the count $S_{MN}$ of each cycle of the matrix counter 320 (when a complete image is formed in the matrix), AND gate 352 in FIG. 16 will become "true" (H' also being "true" at this time) to open a transmission gate 351 so that a horizontal registration trigger 353 can test whether the output of the differential amplifier 351 indicates that the same number of flip-flops are "on" on the left and right sides of the matrix. It is only when such an equality is substantially obtained at count $S_{MN}$, and in addition, at least some minimum number of flip-flops are "on" (so as to indicate at least something is present in the scanning field) that the differential amplifier 351 will provide a suitable output which upon passing through transmission gate 351a at count $S_{MN}$ will trigger the horizontal registration trigger 353, and thereby turn "on" an H flip-flop to indicate that proper horizontal registration has been achieved. It will be noted in FIG. 13 that it is the unprimed output H' of this H flip-flop which is fed to AND gate 319 to prevent the matrix counter 220 from being reset so as to retain the image in the matrix 325 for which proper horizontal registration is obtained. It will also be noted that the H flip-flop is turned "off" by the leading edge of the registration count $K_R$ which assures that it is "off" prior to the registration procedure.

Having described how the registration detector 350 achieves proper horizontal registration, it will now be described how the horizontally registered image retained in the matrix is now vertically registered, again using the "center of black" approach. Referring again to FIG. 16, it will be seen that the upper flip-flop outputs are summed and fed to one input of a differential amplifier 354, while the lower half flip-flop outputs are summed and fed to the other input of the differential amplifier 354. The output of the differential amplifier 354 is fed through a transmission gate 354 which is opened when H is true (V' also being "true" at this time) to three trigger circuits, a down trigger 355, an up trigger 356, and a vertical registration trigger 359. The down trigger 355 serves to provide a trigger pulse whenever the output of the differential amplifier 354 indicates that there are more flip-flops "on" in the upper half of the matrix (which occurs when the image is too high in the matrix), the resultant trigger pulse passing through AND gate 357 (H and V' being true) to form the downshift pulse DU which shifts the image in the matrix (FIGS. 13 and 15) down one row. If there are still too many flip-flops "on" after the image is shifted one row downward, the output from the differential amplifier 354 will still indicate that the image is too high, and again the down trigger 355 will be triggered to produce another downshift pulse DS. This repeated pulsing of the down trigger 355 continues until the summations of the upper and lower flip-flops are sufficiently equal within the acuracy provided. When this occurs, the output of the differential amplifier 354 will reach a level which will trigger the vertical registration trigger 359 and thereby cause a pulse to pass through AND gate 360 to turn "on" a V flip-flop to indicate that correct vertical registration has been achieved.

In the event that the image in the matrix is too low (instead of too high) it will be the up trigger 356 which is triggered (instead of the down trigger 355) to produce successive up shift pulses US until the output of the differential amplifier 354 recognizes that substantially the same number of flip-flops are "on" in upper and lower halves of the matrix. Then, as described before, the differential amplifier will trigger the vertical registration trigger 359 to thereby turn "on" the V flip-flop to indicate that proper vertical registration is achieved. It will be noted in FIG. 16 that the primed output V' of the V flip-flop is fed to the AND gates 357 and 358. This is done in order to prevent any further shift pulses from being produced once proper vertical registration is achieved, thereby retaining the final position of the image in the matrix. It will also be noted in FIG. 16 that like the H flip-flop, the V flip-flop is turned "off" by the leading edge of the registration count $K_R$ in order to assure that it will be "off" at the start of the registration procedure.

One further point to note with respect to FIG. 16 is with regard to how the error signal $e_e$ is produced. If for some reason it is not possible to obtain proper registration, either horizontal or vertical, at least one of the H and V flip-flops will not be turned "on" during the registration count $K_R$. Thus, by feeding the unprimed H' and V' of these flip-flops through an OR gate 361 to an AND gate 362 along with the inverse of the registration count $K_R$, the AND gate 362 will become "true" to provide an error signal $e_e$ whenever both horizontal and vertical registration are not achieved by the time the registration count $K_R$ is completed.

Figure 17:
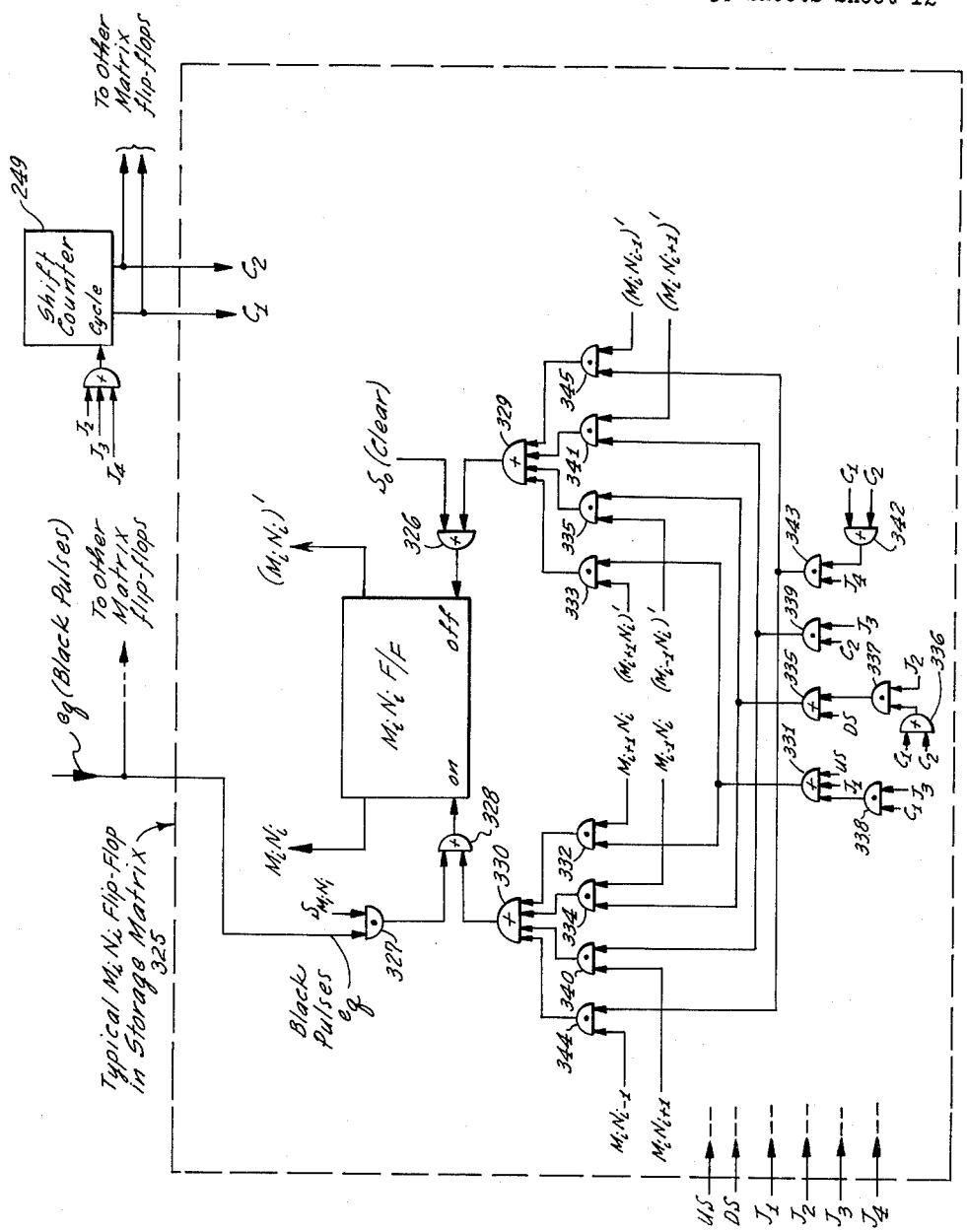
FIG. 17 is a block and circuit diagram illustrating a typical flip-flop in the matrix of FIG. 15 along with its associated logic circuitry.

Having described the construction and operation of a typical embodiment of the registration detector 350 with reference to FIG. 16, the construction and arrangement of a typical one of the matrix flip-flops will now be considered in detail with reference to FIG. 17 in order to permit the operation of the matrix to be clearly understood. It will be recognized that other flip-flops in the matrix may be similarly constructed. Thus, turning now to FIG. 17, a typical flip-flop is illustrated which will be designated as $M_iN_i$, with an unprimed output $M_iN_i$ and a primed output $(M_iN_i)'$. The $M_iN_i$ flip-flop (like all other flip-flops in the matrix) is cleared by the count $S_0$ provided at the start of each cycle of the matrix counter 320 (FIG. 13), the count $S_0$ being fed to the "off" input of the $M_iN_i$ flip-flop through an OR gate 326 as indicated in FIG. 17.

As the matrix counter 320 of FIG. 13 cycles through counts $S_{11}$ to $S_{MN}$, black pulses $e_q$ are provided at the output of the pulse former 314 (FIG. 13), each such pulse $e_q$, when occurring, being fed to a respective one of the matrix flip-flops in accordance with the particular count of the matrix counter 320 which is present at that time. For the typical $M_iN_i$ flip-flop illustrated in FIG. 17, it will be assumed that the count $S_{M_iN_i}$ corresponds thereto, the $S_{M_iN_i}$ line from the matrix counter being fed, along with the line containing the $e_q$ pulses, to an AND gate 328. The output of AND gate 328 is in turn fed to the "on" input of the $M_iN_i$ flip-flop through OR gate 328. Thus, during each cycling of the matrix counter 320, the $M_iN_i$ flip-flop will be turned "off" (that is, cleared) by the initial count $S_0$, and at its respective count $S_{M_iN_i}$ will be turned "on" if a black pulse $e_q$ is produced at that count, which will occur if the respective area of the scanning field corresponding to the $M_iN_i$ flip-flop is black at that time. If instead, the corresponding area in the scanning field is not black, no $e_q$ pulse will be produced and the $M_iN_i$ flip-flop will accordingly remain "off."

It will be remembered that the matrix counter 320 in FIG. 13 continues to cycle and form a new image in the matrix 325 for each cycle until the registration counter 350 indicates that proper horizontal registration is achieved by the H flip-flop turning "on" and the primed output H' thereof becoming "false." The image in the matrix is then retained, except that the registration detector 350 provides shift pulses US and DS for shifting the image in the matrix either upwards or downwards until the image is properly registered vertically as well as horizontally. The specific manner in which the shift pulses US and DS act to shift the image in the matrix will now be explained in detail with reference to the illustrative $M_iN_i$ flip-flop of FIG. 17, it being understood that other flip-flops in the matrix may be similarly constructed.

Referring to FIG. 17, it will be seen that the upshift pulses US are fed to both the "on" and "off" inputs of the $M_iN_i$ flip-flop, being fed to the "on" input by way of OR gate 331, AND gate 332, OR gate 330, and OR gate 328; and being fed to the "off" input by way of OR gate 331, AND gate 333, OR gate 329, and OR gate 326. The AND gate 322 in the "on" input path is fed by the unprimed output $M_{i+1}N_i$ of the next lower flip-flop, $M_{i+1}N_i$, while the AND gate 333 in the "off" path is fed by the primed output $(M_{i+1}N_i)'$ thereof. It will be understood, therefore, that the application of an upshift pulse US will cause flip-flop $M_iN_i$ in FIG. 17 to end up in a state in accordance with the state of the next lower flip-flop $M_{i+1}N_i$. For example, if the next lower flip-flop $M_{i+1}N_i$ is "on," its unprimed output $M_{i+1}N_i$ will be "true" to cause the upshift pulse US to be steered through AND gate 332 to the "on" input of the $M_iN_i$ flip-flop to switch the $M_iN_i$ flip-flop to the same "on" state as the next lower flip-flop $M_{i+1}N_i$. If the $M_iN_i$ flip-flop is already "on" it, of course, remains "on." On the other hand, if the next lower flip-flop $M_{i+1}N_i$ is "off," then its primed output $(M_{i+1}N_i)'$ will be "true" and the upshift pulse US will now be steered through AND gate 333 to the "off" input of the $M_iN_i$ flip-flop to thereby turn flip-flop $M_iN_i$ "off" (if it is not already "off") so that the $M_iN_i$ flip-flop will again correspond to the state of the next lower flip-flop $M_{i+1}N_i$. In order to prevent mistriggering, the $M_iN_i$ flip-flop (as well as the other matrix flip-flops) is suitably designed so that the signals at its outputs $M_iN_i$ and $(M_iN_i)'$ will remain for a sufficient period of time to permit any other flip-flop to be switched in accordance therewith, before the $M_iN_i$ flip-flop is itself switched by signals applied to its inputs.

Since an upshift pulse US will act similarly on all other matrix flip-flops it will be understood that the effect of each upshift pulse US will be to cause the entire image in the matrix to be shifted one row upward. As far as the flip-flops in the bottom row of the matrix are concerned, they have no lower flip-flops to receive signals from and are thus prevented from changing by not having upshift pulses US fed thereto.

The downshift pulses DS are caused to provide shifting in a similar manner to that just described for the upshift pulses US, except that shifting is now downward. This is accomplished, as illustrated in FIG. 17 for flip-flop $M_iN_i$ by making use of the unprimed and primed outputs $M_{i-1}N_i$ and $(M_{i-1}N_i)'$ from the next upper flip-flop $M_{i-1}N_i$. Thus, each downshift pulse DS is passed through OR gate 335 to either the "on" or "off" input of the $M_iN_i$ flip-flop by way of either AND gate 334 or AND gate 325, respectively, depending upon whether the unprimed output $M_{i-1}N_i$ or the primed output $(M_{i-1}N_i)'$ of the next upper flip-flop $M_{i-1}N_i$ is "true." Each downshift pulse DS thereby causes the $M_iN_i$ flop-flop to end up in a state in accordance with the next upper flip-flop $M_{i-1}N_i$ and since this occurs for all matrix flip-flops (except the top row whose flip-flops remain unchanged), the image in the matrix is effectively shifted one row downward for each downshift pulse DS.

With the above explanation of how the image in the matrix may be shifted upward or downward in order to obtain proper vertical registration, it will now be explained how the image in the matrix may also be suitably shifted in response to each of the signals $J_1$, $J_2$, $J_3$ and $J_4$ from the reject counter 65 (FIG. 1), which as previously described in connection with FIG. 1, are provided to permit the scanning system to attempt to recognize the character in the scanning field with a number of different registrations. For purposes of illustration it will be assumed that: during count $J_1$ the image is to be shifted one row upward from its initial $J_0$ position, during count $J_2$ the image is to be shifted one row downward from its $J_0$ position, during count $J_3$ the image is to be shifted one column to the left from its $J_0$ position, and during count $J_4$ the image is to be shifted one column to the right from its $J_0$ position. Obviously, various other shifting could be suitably provided, but these will suffice for illustrative purposes.

Considering count $J_1$ first which is to cause the image to be shifted one row upward, it will be understood that this may be accomplished just as previously described for a single upshift pulse US. Thus, referring to FIG. 17, it will be seen that the count $J_1$ is applied to the same OR gate 331 as the upshift signal US and operates in the same manner to cause the image in the matrix to be shifted upwards one row.

The $J_2$ count which is to shift the image in the matrix one row downward from its $J_0$ position has to provide for the shifting of the image two rows downward, since at the start of the $J_2$ count, the image will reside in a position one row upward from its $J_0$ position as a result of the $J_1$ count. In order to provide for two shifts during count $J_2$, as well as during counts $J_3$ and $J_4$ for which two shifts are also required, a shift counter 249 is provided as illustrated in FIG. 17 which produces the two counts $C_1$ and $C_2$ in response to the leading edge of each of the counts $J_2$, $J_3$ and $J_4$. Thus, when count $J_2$ of the reject counter is reached, the shift counter 249 produces counts $C_1$ and $C_2$ which are fed through an OR gate 336 to an AND gate 337 along with the count $J_2$, the resulting two pulses appearing at the output of AND gate 337 then acting during count $J_2$, just as would two downshift pulses DS, to cause the image in the matrix to be shifted two rows downward to a position one row downward from its $J_0$ position as is required for the $J_2$ count.

After count $J_2$ the image in the matrix will be one row downward from its $J_0$ position. Consequently, in order to achieve the count $J_3$ position one row to the left of the $J_0$ position, the image is first shifted upward one row to return the image to the $J_0$ position, and then is shifted to the left one column to achieve the $J_3$ position. This is accomplished using the shift counter 249 which again produces the counts $C_1$ and $C_2$. Count $C_1$ is fed to an AND gate 338 along with count $J_3$ so as to provide at the output of AND gate 338 a pulse which acts just like an upshift pulse US to cause the image in the matrix to be shifted one row upward and thereby be returned to its $J_0$ position. Then, during count $C_2$, AND gate 339 to which count $C_2$ is fed along with count $J_3$ becomes "true" to apply a shift pulse to either the "on" input or the "off" input of the $M_iN_i$ flip-flop by way of either AND gate 340 or AND gate 341, respectively, depending upon whether the unprimed output $M_iN_{i+1}$ or the primed output $(M_iN_{i+1})'$ of the flip-flop $M_iN_{i+1}$ in the next column to the right is "true." Since this occurs during count $C_2$ of reject count $J_2$ in a similar manner for every matrix flip-flop (except the flip-flops in the right most column which remain unchanged), the entire image will effectively be shifted one column to the left to end up in the required $J_3$ position.

For the reject count $J_4$, which is the final count of the reject counter 65 (FIG. 1) for which an attempt is made to recognize the character in the scanning field, it is now required that the image be shifted two columns to the right from its one column to the left $J_3$ position in order to end up one column to the right of its $J_0$ position as required for count $J_4$. This is accomplished by feeding the counts $C_1$ and $C_2$ (which are again produced by the shift counter 249 during count $J_4$) through an OR gate 342 to an AND gate 343 along with count $J_4$, each of the two pulses appearing at the output of the AND gate 343 then being fed by way of either AND gate 344 or AND gate 345 to either the "on" or "off" input of the $M_iN_i$ flip-flop, depending upon whether the unprimed output $M_iN_{i-1}$ or the primed output $(M_iN_{i-1})'$ of the flip-flop $M_iN_{i-1}$ in the next column to the left is "true." Since all flip-flops in the matrix are similarly effected during $J_4$, the image in the matrix is shifted two columns to the right to produce the desired $J_4$ position one column to the right of the $J_0$ position.

The final portion of the scanning system of FIG. 13 which is to be considered more specifically is the scan sequencer 375 a typical embodiment thereof being illustrated in FIG. 18. The main component of the scan sequencer 375 is a scan counter 380. It is this scan counter 380 which initiates the recognition procedure of a new character moved into the scanning field in response to the start signal S, which is applied to the "Set to $K_R$" input of the scan counter 380 along with the final count $K_S$. As indicated in FIG. 18, the registration count $K_R$ (to which the scan counter 380 is set by the start signal S) is fed to a scan clock 382 which produces a plurality of counting pulses for feeding to the "Advance $K_R$ to $K_S$" input of the scan counter 380. The counting rate of the scan clock 382 is chosen so that the scan counter 380 will remain in the registration count $K_R$ long enough for the previously described registration procedure to be performed and, as was there described, if for some reason proper registration is not obtained when the registration count $K_R$ is completed, then the error signal $e_e$ is produced to provide an unreadable character indication.

Between the registration count $K_R$ and the final count $K_S$, the scan counter 380 produces the ten character counts $K_0$ to $K_9$, and during each such character count, the character count produces an additional plurality of counts, as generally indicated in FIG. 18, such as the counts $K_0k_0$ to $K_0k_n$ provided during count $K_0$. These additional counts are used for producing the character signal $e_s$ and the white and black signals $e_w$ and $e_b$ as will now be described.

Considering the scanning signal $e_s$ first, it will be remembered from the general discussion of FIG. 13 that the outputs of the matrix flip-flops whose states constitute the electronic image in the matrix 325 are scanned in a predetermined sequence during each of the counts $K_0$ to $K_9$ in order to perform the character scans illustrated in FIG. 2, a typical sequence for the digit "2" being shown by the consecutive numbers in FIG. 15. It will be understood, therefore, that the desired character scans may be performed as indicated in FIG. 18 merely by feeding the outputs of the respective flip-flops whose areas correspond to the areas in the scanning field which are to be scanned to an OR gate 390 during the proper $k_0$ to $k_n$ counts of each of the counts $K_0$ to $K_9$, the output of the OR gate 390 then constituting the character scanning signal $e_s$. It will be understood that the "true" and "false" states of the output of each matrix flip-flop may be chosen as $+5$ and $-5$ volts, respectively, in order to provide the desired $+5$ to $-5$ peak-to-peak volt scanning signal $e_s$ assumed for the illustrative embodiment of the scan comparator 30 shown in FIG. 3.

The specific manner in which the matrix flip-flop outputs are fed to the OR gate 390 during the proper counts is illustrated in FIG. 18 for a typical flip-flop which will again be designated as $M_iN_i$, it being understood that the other matrix flip-flops whose outputs are used in forming the character scanning signal $e_s$ are similarly arranged. It will be seen in FIG. 18 that the unprimed output $M_iN_i$ of the $M_iN_i$ flip-flop is fed to an AND gate 386 along with the output of an OR gate 385, the OR gate 385 being in turn fed by particular ones of the counts $K_0k_0$ to $K_9k_n$ (only counts $K_0k_1$ and $K_9k_3$ being specifically illustrated in FIG. 18). The particular counts to be fed to the OR gate 385 are chosen so that the $M_iN_i$ flip-flop is outputed at the proper times where required in forming the scanning signal $e_s$ during each of the character scans. Since all other matrix flip-flops to be outputed are similarly arranged, it will be understood that the required scanning of the matrix flip-flops is readily accomplished during each of the counts $K_0$ to $K_9$ as illustrated in FIG. 15 for the "2" scan performed during count $K_2$. The size of the matrix and the counting rate of the scan counter 380 are chosen to provide a character scanning signal $e_s$ which generally approximates that which would be obtained if the scanning field were scanned directly, such as in the previously described optical contour scanning embodiment of FIG. 5. In this connection, it may be noted that sharp transitions in the $e_s$ waveform resulting from electronically scanning a digital matrix, such as the matrix of FIG. 15, will not interfere with the recognition procedure since the scan comparator 30 (considered in detail with reference to FIGS. 3 and 4) is primarily responsive to the running average of the $e_s$ waveform during respective expected black and white periods.

Continuing with the description of the scan sequencer of FIG. 18, it will be understood that the black and white signals $e_b$ and $e_w$ may also be readily produced using the same counts $K_0k_0$ to $K_9k_n$ provided by the scan counter 380. This is accomplished by feeding particular ones of these counts to suitable black and white flip-flops, the outputs of which may then constitute the black and white signals $e_b$ and $e_w$ for feeding to the scan comparator 30 of FIG. 1 along with the scanning signal $e_s$. The particular counts fed to the "on" and "off" inputs of the black and white flip-flops are chosen so as to switch the black and white signals $e_b$ and $e_w$ in accordance with the black and white expected during each of the character scans, typical counts which might be fed to these "on" and "off" inputs being illustrated in FIG. 18. For use with the scan comparator 30 illustrated in FIG. 3, the "true" and "false" states of the black and white flip-flop outputs may be chosen as $+5$ and $-5$ volts, respectively.

In order to illustrate how the scan sequencer 375 of FIG. 18 may operate during a typical "2" scan of the matrix of FIG. 15, the table of FIG. 19 is presented (on the same sheet as FIGS. 9-12 and 14) showing the particular matrix flip-flop which is outputed during each of the 37 counts $K_2k_0$ to $K_2k_{36}$ of the "2" scan. Also shown in FIG. 19 are the states to which the white and black flip-flops are switched during the "2" scan in order to provide suitable black and white signals $e_s$ and $e_w$ for comparison with the scanning signal $e_s$. From this table it should be quite evident how particular counts provided by the scan counter 380 of the scan sequencer 375 may be chosen to provide the scanning signal $e_s$ and the black and white signals $e_b$ and $e_w$ for use in the recognition procedure described in connection with FIG. 1.

One further point to note in FIG. 18 is the manner in which the sequencer provides for additional tries to be made at recognizing a character in the event that no character is recognized when the scan counter 380 reaches its final count $K_s$ after having performed the ten character scans of FIG. 2. It will be remembered from the description of FIG. 1, that when no character is identified at count $K_s$, the reject counter 65 is advanced to count $J_1$ which initiates another try at recognizing the character with a different registration, the reject counter 65 permitting four such additional tries until count $J_5$ is reached, whereupon an unreadable character indication is obtained. The scan sequencer of FIG. 18 provides for such additional tries by feeding each of the reject counter counts $J_1$ to $J_4$ through a suitable delay 391 to the "Set to $K_0k_0$" input of the scan counter 380. As a result, each time the reject counter is advanced in response to the failure to identify a character at count $K_s$, the scan counter 380 is returned to count $K_0k_0$ to repeat counts $K_0k_0$ to $K_9k_n$ and thereby make another attempt at reading the character in the scanning field. The delay 391 is provided before permitting the counts $J_1$ to $J_4$ to reset the scan counter 380 back to count $K_0k_0$ in order to give the image in the matrix sufficient time to shift to the new registration for which another try is to be made.

Before leaving the description of the electronic matrix version of the scanning system 25 of FIG. 1, it is to be noted that various other image dissector scanning means as well as a flying spot scanner could be used to form an electronic image in the matrix. Also, instead of using a matrix of bistable devices, three-level devices (or even analog devices) could be used to represent the electronic image.

While the foregoing disclosure has been concerned primarily with certain illustrative embodiments, it will be appreciated that the invention is susceptible of various modifications in both construction and arrangement, and may be employed for various uses other than that disclosed herein. The present invention, therefore, is to be considered as including all modifications and variations falling within the scope of the invention as defined in the appended claims.

What is claimed is:

1. In a character reading system, a record medium having characters provided thereon, means for scanning, control means for scanning a character with a plurality of different scans respectively corresponding to the possible characters to be read by the system, means for determining whether the observations obtained during each scan of a character substantially corresponds to what is expected during that scan, and means for recognizing a character in response to the determinations made by said last mentioned means.

2. In a character reading system, a record medium having characters provided thereon, means for scanning, control means for scanning a character with a plurality of different scans respectively corresponding to the possible characters to be read by the system and for producing an electrical scanning signal in response to said scanning, means for producing at least one electrical comparison signal during each scan having a predetermined relation to the electrical scanning signal to be expected when the character being scanned corresponds to the character scan being performed, means for comparing said scanning signal and said comparison signal during each scan, and means for recognizing a character in response to the operation of said last mentioned means.

3. In a character reading system, a record medium having characters provided thereon, scanning means, control means for scanning a character with a plurality of character scans, each scan being uniquely representative of the contour of a respective character, and means coupled to said scanning means for determining which of the plurality of character scans corresponds to the character being scanned.

4. In a character reading system, a record medium having characters provided thereon, scanning means, control means for scanning a character with a plurality of character scans, each scan being uniquely representative of the contour of a respective character, and means coupled to said scanning means for recognizing a character in response to the character scans performed thereon.

5. In a character reading system, a record medium having characters provided thereon, scanning means, control means for scanning a character with a plurality of different character scans, each scan being uniquely representative of the contour of a respective character and following a path so as to traverse a substantial portion of the character contour and a predetermined portion of the background, means for determining whether the running average level observed during each of the plurality of character scans performed on a character substantially corresponds to what is expected during each respective scan, and means for recognizing a character in response to the operation of said last mentioned means.

6. In a character reading system, a record medium having characters provided thereon, scanning means, control means for scanning a character with a plurality of character scans, each scan being uniquely respresentative of the contour of a respective character, means for producing an electrical scanning signal in response to the scanning performed by said scanning means, signal generating means operative during each of the character scans for producing at least one respective electrical comparison signal, means for comparing the running average level of said scanning signal with said comparison signal during each scan, and means for recognizing a character in response to the operation of said last mentioned means.

7. In a character reading system, a record medium having characters provided thereon, scanning means, control means for scanning a character with a plurality of character scans, each scan being uniquely representative of the contour of a respective character, said scanning means including means for providing an initial registration of a character with respect to the character scans to be performed by said scanning means, means coupled to said scanning means for recognizing a character being scanned by determining which of the character scans substantially corresponds to the character being scanned, and means operative in the event that none of the character scans corresponds to the character being scanned to cause said scanning means to perform the character scans over again at least one more time with a different registration of the character relative to the character scans.

8. In a character reading system, a record medium having characters provided thereon, scanning means, control means for scanning a character with a plurality of character scans, each scan being uniquely representative of the contour of a respective character, said scanning means including means for providing an initial registration of a character relative to the character scans to be performed by said scanning means, means for producing an electrical scanning signal in response to the scanning performed by said scanning means, means operative during each character scan for producing at least one electrical comparison signal having a predetermined relation to the electrical scanning signal to be expected when the character being scanned corresponds to the character scan being performed, comparison means for comparing the running average level of said scanning signal with said comparison signal during each scan, means for recognizing a character in response to said comparison means obtaining a proper comparison between the running average level of said scanning signal and said comparison signal during a particular character scan, and means operative in the event that a character cannot be recognized by said comparison means to cause said scanning means to perform the character scans over again at least one more time with a different registration of the character relative to the character scans.

9. In a character reading system, a record medium having characters provided thereon, means for scanning, control means for scanning a character with a plurality of different scans respectively corresponding to the possible characters to be read by the system, means for producing an electrical scanning signal in response to the scanning performed by said scanning means, integrating means operable during each scan for integrating the scanning signal, means operable in response to the output of said integrating means for recognizing when the integrated scanning signal reaches at least one predetermined level, and means for identifying a character in response to the operation of said last mentioned means.

10. In a character reading system, a record medium having characters provided thereon, means for scanning, control means for scanning a character with a plurality of character scans, each scan being uniquely representative of the contour of a respective character, means for producing an electrical scanning signal in response to the scanning performed by said scanning means, first integrating means operable during each scan for integrating the scanning signal during periods when character portions are expected, second integrating means operable during each scan for integrating the scanning signal during periods when character portions are not expected, means for detecting when the outputs of said first and second integrating means arrive at respective levels, and means for recognizing a character in response to the operation of said last mentioned means.

11. In a character reading system, a record medium having characters provided thereon, means for scanning, control means for scanning a character with a plurality of character scans, each scan being uniquely representative of the contour of a respective character, said scanning means including means for providing an initial registration of a character relative to the character scans to be performed by said scanning means, means for producing an electrical scanning signal in response to the scanning performed by said scanning means, integrating means operable during each scan for integrating the scanning signal, means operable in response to the output of said integrating means for recognizing when the integrated scanning signal reaches at least one predetermined level, means for identifying a character in response to the operation of said last mentioned means, and means operative in the event that a character cannot be recognized to cause said scanning means to perform the character scans over again at least one more time with a different registration of the character relative to the character scans.

12. The invention in accordance with claim 6, wherein said signal generating means produces two comparison signals, one comparison signal being representative of expected character portions and the other comparison signal being representative of expected background portions.

13. The invention in accordance with claim 3, wherein said scanning means operates to perform the character scans optically.

14. The invention in accordance with claim 3, wherein said scanning means operates to perform the character scans electronically.

15. In a character reading system, a record medium having characters provided thereon, a cathode ray tube, signal generating control means for providing signals to said cathode ray tube so as to cause a plurality of character scans to be traversed on the face of the tube, each scan being uniquely representative of the contour of a respective character, means for imaging the scans traversed on the face of the cathode ray tube onto a scanning field portion of said record medium, photo-sensitive means to which light from said cathode ray tube is fed after reflection from the scanning field portion of said record medium so as to produce an electrical scanning signal, said signal generating means also providing at least one electrical comparison signal during each scan having a predetermined relation to the electrical scanning signal to be expected when the character being scanned corresponds to the character scan being performed, and means operative to recognize a character in response to a comparison of the running average level of said scanning signal and said comparison signal during each of the character scans.

16. In a character reading system, a record medium having characters provided thereon, a cathode ray tube, signal generating control means for providing signals to said cathode ray tube so as to cause a plurality of character scans to be traversed on the face of the tube, said signal generating means also including means for generating at least one registration scan prior to the character scans, means for imaging the scans traversed on the face of the cathode ray tube onto a scanning field portion of said record medium, photosensitive means to which light from said cathode ray tube is fed after reflection from the scanning field portion of said record medium so as to produce an electrical scanning signal, means coupled to said signal generating means and responsive to the scanning signal produced during the registration scan for setting the character scans to follow to a predetermined registration relative to a character in the scanning field portion of said record medium, said signal generating means also providing at least one electrical comparison signal during each character scan having a predetermined relation to the electrical scanning signal to be expected when the character being scanned corresponds ot the character scan being performed, and means operative to recognize a character in response to a comparison of the running average level of said scanning signal and said comparison signal during each of the character scans.

17. In a character reading system, a record medium having characters provided thereon, a cathode ray tube, signal generating control means for providing signals to said cathode ray tube so as to cause a plurality of character scans to be traversed on the face of the tube, said signal generating means also including means for generating at least one registration scan prior to the character scans, means for imaging the scans traversed on the face of the cathode ray tube onto a scanning field portion of said record medium, photosensitive means to which light from said cathode ray tube is fed after reflection from the scanning field portion of said record medium so as to produce an electrical scanning signal, means coupled to said signal generating means and responsive to the scanning signal produced during the registration scan for setting the character scans to follow to an initial registration relative to a character in the scanning field portion of said record medium, said signal generating means also providing at least one electrical comparison signal during each character scan having a predetermined relation to the electrical scanning signal to be expected when the character being scanned corresponds to the character scan being performed, means operative to recognize a character in response to a comparison of the running average level of said scanning signal with said comparison signal during each of the character scans, and means operative in the event that a character cannot be recognized to cause said signal generating means to perform the character scans over again at least one more time with a different registration of the character relative to the character scans.

18. In a character reading system, a record medium having character provided thereon, scanning means for scanning a scanning field portion of said record medium and for producing electrical signals in response thereto, means coupled to said scanning means for forming an electronic image of a character in the scanning field portion of said record medium, means for electronically scanning said image, control means for electronically scanning said image with a plurality of character scans, each scan being uniquely representative of the contour of a respective character, and means coupled to said last mentioned means for recognizing a character in response to the performance of the character scans by said scanning means.

19. In a character reading system, a record medium having characters provided thereon, scanning means for optically scanning a scanning field portion of said record medium and for producing electrical signals in response thereto, means coupled to said scanning means for forming a properly registered electronic image of a character in the scanning field portion of said record medium, means for electronically scanning said image, control means for electronically scanning said image with a plurality of character scans so as to produce an electrical scanning signal, each scan being uniquely representative of the contour of a respective character, means operative during each character scan for producing at least one comparison signal having a predetermined relation to the electrical scanning signal to be expected when the electronic image being scanned contains a character which corresponds to the character scan being performed, and means utilizing said scanning signal and said comparison signal for recognizing a character.

20. In a character reading system, a record medium having characters provided thereon, scanning means for optically scanning a scanning field portion of said record medium and for producing electrical signals in response thereto, means coupled to said scanning means for forming a properly registered electronic image of a character in the scanning field portion of said record medium, electronic scanning means, control means for electronically scanning said image with a plurality of character scans so as to produce an electrical scanning signal, each scan being uniquely representative of the contour of a respective character, means operative during each character scan for producing at least one comparison signal having a predetermined relation to the electrical scanning signal to be expected when the electronic image being scanned corresponds to the character scan being performed, means for comparing the running average level of said scanning signal with said comparison signal, means for recognizing a character in response to the operation of said last mentioned means, and means operative in the event that a character cannot be recognized for causing said electronic scanning means to perform the character scans over again at least one more time with a different registration of the electronic image relative to the character scans.

References Cited by the Examiner
UNITED STATES PATENTS

| | | | |
|---|---|---|---|
| 2,919,425 | 12/59 | Ress | 340—146.3 |
| 2,933,246 | 4/60 | Rabinow | 340—146.3 |

MALCOLM A. MORRISON, *Primary Examiner.*